United States Patent [19]
Zachary et al.

[11] Patent Number: 5,930,990
[45] Date of Patent: Aug. 3, 1999

[54] METHOD AND APPARATUS FOR ACHIEVING POWER AUGMENTATION IN GAS TURBINES VIA WET COMPRESSION

[75] Inventors: Richard E. Zachary, Clinton; Roger D. Hudson, Zachary, both of La.

[73] Assignee: The Dow Chemical Company, Midland, Mich.

[21] Appl. No.: 08/645,781

[22] Filed: May 14, 1996

[51] Int. Cl.$^6$ .................................. F02C 7/00; F02G 3/00
[52] U.S. Cl. ..................... 60/39.53; 60/39.05; 60/39.091; 60/39.093; 60/39.3
[58] Field of Search ............................ 60/39.05, 39.091, 60/39.093, 39.3, 39.53

[56] References Cited

U.S. PATENT DOCUMENTS

| | | | |
|---|---|---|---|
| 2,863,282 | 12/1958 | Torell | 60/35.6 |
| 2,968,164 | 1/1961 | Hanson . | |
| 3,978,251 | 8/1976 | Stetson et al. . | |
| 4,047,379 | 9/1977 | Brookes et al. . | |
| 4,418,527 | 12/1983 | Schlom et al. . | |

(List continued on next page.)

FOREIGN PATENT DOCUMENTS

| | | |
|---|---|---|
| 0 444 913 A1 | 2/1991 | European Pat. Off. . |
| 1082598 | 12/1954 | France . |
| 248309 | 2/1948 | Germany . |
| 250738 | 7/1948 | Germany . |
| 2549790 | 11/1975 | Germany . |

(List continued on next page.)

OTHER PUBLICATIONS

Expendable Engine Tested for Army Missiles; Aviation Week & Space Technology, Sep. 6, 1993. No. 10, New York, US; p. 26.

Patent Abstracts of Japan; Publication No.—63248931; Publication Date—Oct. 17, 1988; Applicant—Hitachi Ltd.; Inventors—Kirikami Seiichi; Sato Isao; Hirose Fumiyuki; Iizuka Nobuyuki; Kuroda Michio.

Patent Abstracts of Japan; Publication No.—05195809; Publication Date—Aug. 3, 1993; Applicant—Tohoku Electric Power Co. Inc.; Inventor—Sugawara Michio; Mejika Manabu; Sakai Genichi; Sato Tsuneo; Yamada Noboru; Sakai Hiromasa.

P.G. Hill, Aerodynamic and Thermodynamic Effects of Coolant Injection On Axial Compressors, The Aeronautical Quarterly, pp. 331–348, Nov. 1963.

I. T. Wetzel et al., "Water Spray Injection of an Axial Flow Compressor", *Proceedings of the Midwest Power Conference*, vol. XI, Apr. 18–19–20, 1949, pp. 376–380.

(List continued on next page.)

*Primary Examiner*—Charles G. Freay

[57] ABSTRACT

A wet compression power augmentation apparatus and method for effectively adding a mass flow of nebulized water to a gas turbine by use of a spray rack group assembly having at least one spray rack water pipe and at least one spray rack water nozzle. Nebulized water mass flow is added in increments such that operationally-induced thermal stresses within the gas turbine are sufficiently minimized to preserve the structural integrity of the gas turbine. Monitoring of the temperature profile of fluid-cooled rotor blades in the turbine section with an optical pyrometer to detect clogging of cooling pathways in those rotor blades from impurities in the liquid added through the wet compression, monitoring of temperature in the gas turbine compressor inlet to guard against the possibility of icing, and use of a laser emitter and laser target measuring system mounted to the exterior of the gas turbine hosing to detect deformation in the housing of the gas turbine from associated cooling effects help enable safe use of the wet compression technique. Addition of steam in the compressor inlet to control the inlet air temperature and to thereby prevent ice-forming conditions in the compressor inlet and elsewhere extends the benefits of the wet compression technique to operation in cooler climates.

88 Claims, 7 Drawing Sheets

U.S. PATENT DOCUMENTS

| | | | |
|---|---|---|---|
| 4,648,711 | 3/1987 | Zachary | 356/44 |
| 4,667,467 | 5/1987 | Archer et al. | 60/39.02 |
| 4,710,095 | 12/1987 | Freberg et al. | |
| 4,773,846 | 9/1988 | Munk | 60/39.05 |
| 4,808,235 | 2/1989 | Woodson et al. | 134/22.19 |
| 4,926,620 | 5/1990 | Donle | 55/89 |
| 5,010,726 | 4/1991 | Garland | |
| 5,011,540 | 4/1991 | McDermott | |
| 5,054,279 | 10/1991 | Hines | |
| 5,121,596 | 6/1992 | Takehara et al. | 60/39.05 |
| 5,299,418 | 4/1994 | Kerrebrock | |
| 5,331,806 | 7/1994 | Warkentin | 60/39.465 |
| 5,406,786 | 4/1995 | Scharpf et al. | |
| 5,463,873 | 11/1995 | Early et al. | |
| 5,471,831 | 12/1995 | Rowe | |
| 5,477,684 | 12/1995 | Prueitt | |
| 5,523,028 | 6/1996 | Reens et al. | |
| 5,525,268 | 6/1996 | Reens | |

FOREIGN PATENT DOCUMENTS

| | | | |
|---|---|---|---|
| 2931178 | 2/1981 | Germany | |
| 4114678 | 11/1992 | Germany | 60/39.05 |
| 173323 | 9/1985 | Japan | 60/39.3 |
| 63-248931 | 10/1988 | Japan | |
| 4-5436 | 1/1992 | Japan | 60/39.53 |
| 5-195809 | 8/1993 | Japan | |
| 437838 | 1/1975 | U.S.S.R. | |
| 2280224 | 7/1994 | United Kingdom | |

OTHER PUBLICATIONS

R. V. Kleinschmidt, "Value of Wet Compression in Gas–Turbine Cycles", *Mechanical Engineering*, vol. 69, No.2, Feb. 1947, pp. 115–116.

"Water Ingestion into Axial Flow Compressors", Technical Report AFAPL–TR–76–77, Aug. 1, 1975–Aug. 31, 1976, pp. 1–111.

David Gordon Wilson, "The Design of High–Efficiency Turbomachinery and Gas Turbines", 1984, p. 25.

M. F. Bardon, "Modified Brayton Cycles Utilizing Alcohol Fuels", *Journal of Engineering for Power*, The American Society of Mechanical Engineers, ASME Paper No. 81–GT–103 Mar. 8–11, 1981, pp. 1–8.

M. F. Bardon, "Modified Brayton Cycles Utilizing Alcohol Fuels", *Journal of Engineering for Power*, vol. 104, Apr. 1982, pp. 341–348.

Donald G. Davies et al., "Improved Combustion Turbine Efficiency with Reformed Alcohol Fuels", *The American Society of Mechanical Engineers*, ASME Paper No. 83–GT–60, pp. 1–5.

J. A. C. Fortin et al., "Gas Turbine Compressor Interstage Cooling Using Methanol", *The American Society of Mechanical Engineers*, ASME Paper No. 83–GT–230, pp. 1–5.

W. H. von KleinSmid et al., "Methanol Combustion in a 26–MW Gas Turbine", *The American Society of Mechanical Engineers*, ASME Paper No. 81–GT–64, Mar. 9–12, 1981, pp. 1–6.

P. J. Kirby et al., "Infrared Thermometry for Control and Monitoring of Industrial Gas Turbines", *The American Society of Mechanical Engineering*, Presented at the International Gas Turbine Conference and Exhibit Dusseldorf, West Germany, ASME Paper No. 86–GT–267, Jun. 8–12, 1986.

M. F. Bardon et al., "Methanol Dissociative Intercooling in Gas Turbines", *The American Society of Mechanical Engineers* ASME Paper No. 82–GT–176, pp. 1–10.

Gas Turbine Performance Improvement Direct Mixing Evaporative Cooling System American Atlas Cogeneration Facility Rifle, Colorado; Nolan, et al.; ASME Paper No. 90–GT–368 (1990).

WISGSK A Computer Code For The Prediction Of A Multistage Axial Compressor Performance With Water Ingestion—Final Report; Tsuchiya, et. al.; NASA Contractor Report 3624 (1982).

Effect Of Water Spraying On Operation Of The Compressor Of A Gas Turbine Engine, L. I. Slobodyanyuk, *Energeticka*, No. 1; pp. 92–95; (1973).

The Improved Parallel Compound Dual Fluid Cycle Gas Turbine Power Plant (Recover A Part Of Heat Of Condensation Of Injected Steam); S. Yufeng et. al.; ASME Paper No. 95–CTP–70 (1995).

Gas Turbines With Heat Exchanger And Water Injection In The Compressed Air; Gasparovic and Hellemans; *Combustion*, Dec. 1972.

Improved Static And Dynamic Performance Of Helicopter Powerplant; German N. Leonov; $48^{th}$ *Annual Forum Proceedings of the American Helicopter Society, Part 1*; pp. 339–345 (1992).

Axial–Compressor Flow Distortion With Water Ingestion; Tsuchiya, et. al.; AIAA Paper No. AIAA–83–0004; (1983).

Direct And System Effects Of Water Ingestion Into Jet Engine Compressors; Murthy, et. al.; Presented at AIAA/ASME $4^{th}$ Joint Fluid Mechanics, Plasma Dynamics and Lasers Conference, May 12–14, 1986.

Fern Engineering, Inc., Mar. 19, 1997 Website Excerpt from the Internet.

Martensitic Steels With Low C Content. Part II; Strength, Toughness, Corrosion Resistance, Interaction Of Corrosion And Mechanical Stress, Application Examples; P. Brezina; HTM Harterei–Technische Mitteilungen (1983).

Modeling Of Hybrid Combustion Turbine Inlet Air Cooling Systems; Cross, et. al.; pp. 1335–1341; ASHRAE Transactions; SD–95–19–3; Technical and Symposium Papers (1995).

Union Electric Company's Combustion Turbine Inlet Air Cooling Study; Henderson, et. al.; ASME Paper No. 93–JPGC–GT–6 (1993).

Cycles And Thermal Circuits Of Steam–Gas Turbine Installations, With Cooling Of The Gas During Compression By The Evaporation Of Injected Water; P. Poletavkin; Teplofizika Vysokikh Temperatur; vol. 8, No. 3; pp. 662–628; (May–Jun. 1970).

Benefits Of Compressor Inlet Air Cooling For Gas Turbine Cogeneration Plants; DeLucia et. al.; ASME Paper N. 95–GT–311.

FT4000 Hat With Natural Gas Fuel; W. Day; IGTI–vol., 7, ASME Cogen–Turbo; (1992).

The Theory And Operation Of Evaporative Coolers For Industrial Gas Turbine Installations; R. Johnson, Sr.; pp. 327–334; Journal of Engineering for Gas Turbines and Power; vol. 111; (Apr., 1989).

ns having a compression section, combustion section, and turbine section. In recent years, the term "combustion turbine" has become more used to reference the same machine. In this regard, this specification will use the term "gas turbine" to represent both the traditionally used term and the term "combustion turbine" as some would reference it at the present time.

METHOD AND APPARATUS FOR ACHIEVING POWER AUGMENTATION IN GAS TURBINES VIA WET COMPRESSION

FIELD OF THE INVENTION

The present invention provides a method and apparatus to facilitate power augmentation of a gas turbine through the use of wet compression.

BACKGROUND OF THE INVENTION

Gas turbines are used in a variety of useful applications. Aviation, shipping, power generation, and chemical processing have all benefited from gas turbines of various designs. Land-based gas turbine power generation facilities can also provide combined cycle benefits when a heat recovery unit is used to generate steam from exhaust gas generated by the gas turbine and a steam turbine is operated by that steam.

In regard to general terminology, the term "gas turbine" traditionally has referred to any turbine system having a compression section, combustion section, and turbine section. In recent years, the term "combustion turbine" has become more used to reference the same machine. In this regard, this specification will use the term "gas turbine" to represent both the traditionally used term and the term "combustion turbine" as some would reference it at the present time.

Gas turbines have a compressor section for compressing inlet air, a combustion section for combining the compressed inlet air with fuel and oxidizing that fuel, and a turbine section where the energy from the hot gas produced by the oxidation of the fuel is converted into work. Usually, natural gas (mostly methane), kerosene, or synthetic gas (such as carbon monoxide) is fed as fuel to the combustion section, but other fuels could be used. The rotor, defined by a rotor shaft, attached turbine section rotor blades, and attached compressor section rotor blades, mechanically powers the compressor section and, in some cases, a compressor used in a chemical process or an electric generator. The exhaust gas from the turbine section can be used to achieve thrust, it can be a source of heat and energy, or, in some cases, it is discarded.

Some turbine sections employ the use of fluid-cooled rotor blades where either pressurized air, steam, or the like is passed through internal cooling cavities within the rotor blades used in the turbine section; this enables higher temperature output from the combustion section.

Gas turbine compressors are periodically cleaned to remove buildups of particulates on internal components. Some of this cleaning can be performed without full shutdown of the gas turbine, and materials such as water, ground pecan hulls, or chemical cleaning mixtures can be either sprayed, blown, or otherwise input into the inlet of the gas turbine after the gas turbine has been operationally configured for such a cleaning operation. At least one such chemical mixture is disclosed in U.S. Pat. No. 4,808,235 entitled "CLEANING GAS TURBINE COMPRESSORS" issued on Feb. 28, 1989 to Woodson, et al.

Other systems for minimizing buildup of particulates on internal components of gas turbines focus on cleaning of the gas turbine inlet air as is, for instance, disclosed in U.S. Pat. No. 4,926,620 entitled "CLEANING GAS TURBINE INLET AIR" issued on May 22, 1990 to Donle.

Materials such as water can also be added when the gas turbine is operating under full load to augment the power output capability of a gas turbine above the output achievable with normally humidified air; such a procedure is identified as wet compression. Wet compression enables power augmentation in gas turbine systems by reducing the work required for compression of the inlet air. This thermodynamic benefit is realized within the compressor of a gas turbine through "latent heat intercooling", where water (or some other appropriate liquid) added to the air inducted into the compressor cools that air, through evaporation, as the air with the added water is being compressed. The added water can be conceptualized as an "evaporative liquid heat sink" in this regard.

The wet compression approach thus saves an incremental amount of work (which would have been needed to compress air not containing the added water) and makes the incremental amount of work available to either drive the load attached to the gas turbine (in the case of a single shaft machine) or to increase the compressor speed to provide more mass flow (which can have value in both single shaft and dual shaft machines).

A good overview of the principles behind wet compression is found in "Water Spray Injection of an Axial Flow Compressor" by I. T. Wetzel and B. H. Jennings (Proceedings of the Midwest Power Conference, Ill. Institute of Technology, Apr. 18–20, 1949, pages 376 to 380); this article is hereby incorporated by reference herein for purposes of describing the background of this application. The article indicates that "water . . . was sprayed into the inlet duct just upstream from the compressor through four Spraying Systems type 1/4 LNN6 nozzles."

An additional incremental contribution to power augmentation is realized in the turbine section by a small increase in mass flow provided by the added vaporized liquid. A further incremental contribution to power augmentation also appears to be provided by an increase in air flow which has been noted to occur with a first, 10–20 gallon per minute, increment of water in a large land-based power gas turbine (an effect also noted in the Wetzel-Jennings article). It should be noted that additional fuel is required to raise the temperature of the cooled (respective to dry air compression) air/steam mixture discharged from the compressor to the firing temperature of the gas turbine; but the value realized from the wet compression effect is greater than the value of the additional fuel needed, resulting in value added to the operation of the system as a whole.

The power augmentation benefits of wet compression have been generally understood for some time. As noted by David G. Wilson in "The Design of High-Efficiency Turbomachinery and Gas Turbines" (1984, Massachusetts Institute of Technology), a six stage centrifugal compressor used in a 1903 vintage turbine built by Aegidius Elling injected water between compressor stages.

In the development of jet aircraft, wet compression using alcohol or water/alcohol mixtures has been of interest as a method for thrust augmentation as noted in American Society of Mechanical Engineers article 83-GT-230 entitled "Gas Turbine Compressor Interstage Cooling Using Methanol" (ASME, New York, 1983) by J. A. C. Fortin and J. F. Bardon. The FortinBardon article points to concerns with wet compression ". . . that the liquid droplets not cause serious erosion of the compressor blades."

The above comment from the Fortin-Bardon article, and another comment in the Wetzel-Jennings article that "there was no evidence of blade erosion although admittedly the tests were of short duration" help to highlight one concern regarding liquid erosion respecting wet compression that, despite the technology's very significant and longappreciated benefits, has contributed to preventing wet compression's practical application. Indeed there are a number of risks to a gas turbine system when wet compression power augmentation is used to improve its operational performance.

As noted, one risk is derived from blade erosive effects; another difficulty (especially in large gas turbine systems) relates to localized and non-uniform cooling problems (due to non-uniform distribution of the added water) within the compressor which can distort the physical components of the gas turbine system in such a way as to cause damage from rubbing of the rotor against the inner wall of the housing and associated seals.

A further significant element of risk derives from the possibility of thermal shock if (1) the gas turbine has essentially achieved thermodynamic equilibrium under full load and (2) the liquid addition is abruptly terminated without feed-forward compensation to the energy being added to the gas turbine; the risk is derived from a potentially damaging and abrupt transient in the internal operating temperature of the turbine section if the evaporative liquid heat sink is removed in this manner.

Another element of risk is due to the possibility that components of the liquid addition system may break away and impact against the relatively delicate moving parts of the gas turbine system. Still another element of risk is established from the chance that gas turbine components will foul from impurities in the liquid added to the compression inlet air, as these impurities are deposited on the gas turbine components as a result of evaporation of the liquid in which they had been dissolved.

With particular regard to land-based gas turbine power generation facilities and chemical processing facilities, the above risk factors, the substantial investment in the gas turbines, and nonlinear, inherent scale-up considerations have collectively prevented the benefits of wet compression from being realized.

What is needed is an approach and system which enables wet compression to be pragmatically implemented in gas turbine power generation facilities and chemical processing facilities. Such a system would enable an immediate benefit to be realized from the existing base of installed gas turbine power generation facilities and chemical processing facilities. Perhaps more importantly, such a system would conceivably enable gas turbines to be optimized for wet compression at the design stage, opening new possibilities in power generation. This patent teaches such a system for enabling the use of wet compression in gas turbine systems.

OBJECTS OF THE INVENTION

It is thus a fundamental object of the present invention to provide a wet compression power augmentation apparatus and method for effectively adding a mass flow of water to the inlet air to the compressor section of a gas turbine through (a) locating a device for adding such water a sufficient distance away from the inlet of the compressor section whereby, in the event any element of the device breaks away and is carried with the inlet air toward the compressor inlet, that element is gravitationally pulled to a lower surface of the inlet duct used to convey air into the gas turbine before entering the compressor inlet, and (b) by providing nebulized water through the device which, given the separation of the device from the compressor inlet, is entrained in the inlet air and is carried therewith into the compressor section of the turbine.

It is a further object of the present invention to provide a wet compression power augmentation apparatus made up of a spray rack group assembly having at least one spray rack water pipe and at least one spray rack water nozzle.

It is a further object of the present invention to provide a wet compression power augmentation apparatus and method which will add the water mass flow in a plurality of nebulized water mass flow increments such that operationally-induced thermal stresses within the gas turbine due to the use of said mass flow of nebulized water are sufficiently minimized to preserve the structural integrity of the gas turbine.

It is a further object of the present invention to provide a wet compression power augmentation apparatus and method for detecting potentially deleterious deformations in the housing of the gas turbine which might be caused from thermal stress due to wet compression power augmentation.

It is a further object of the present invention to provide a wet compression power augmentation apparatus and method for monitoring the temperature profile of fluid-cooled rotor blades in the turbine section so that clogging of cooling pathways in those rotor blades, for example, by the influence of impurities in the liquid added through the wet compression power augmentation apparatus and method, can be detected at the earliest possible time.

It is a further object of the present invention to provide a wet compression power augmentation apparatus and method for temperature measurement in the gas turbine compressor inlet, to (1) guard against the possibility of icing occurring in the inlet to such a degree that this ice, if broken away, might damage downstream elements of the gas turbine, (2) minimize the use of freezing control materials such as either steam or a freezing point depressant, and/or (3) provide an input to a control system which is used to coordinate, monitor and/or control the overall wet compression apparatus and method.

It is a further object of the present invention to provide a wet compression power augmentation apparatus and method which employ a viewport near the compressor inlet so that icing can be monitored.

It is a further object of the present invention to provide a wet compression power augmentation apparatus and method which add steam in the compressor inlet to control the inlet air temperature and to thereby prevent ice-forming conditions in the compressor inlet and elsewhere.

It is a further object of the present invention to provide a wet compression power augmentation apparatus and method using a laser emitter and laser target measuring system mounted to the exterior of the gas turbine housing for detecting deformation in the housing of the gas turbine which might be caused from thermal stress due to wet compression power augmentation.

It is a further object of the present invention to provide a wet compression power augmentation apparatus and method employing an optical pyrometer for monitoring the emitted energy of each of the cooled rotor blades in the turbine section through a sighting tube to characterize the temperature profile of the fluid cooled rotor blades.

It is a further object of the present invention to provide a wet compression power augmentation apparatus and method which have a video camera positioned and focused to scan for ice buildup through a viewport near the compressor inlet so that icing can be monitored.

It is a further object of the present invention to provide a wet compression power augmentation apparatus and method which provide treated water containing sufficient quantities of critical elements contained in the alloys respective to the materials of construction of the gas turbine engine that the resulting water stream minimizes the effects of leaching respecting the alloys of the components of the gas turbine engine as wet compression is executed.

It is a further object of the present invention to provide a wet compression power augmentation apparatus and method which use a restricting orifice to protect the gas turbine from excessive water flow in case a spray nozzle in the spray rack group assembly mentioned above should break away from the assembly.

It is a further object of the present invention to provide a wet compression power augmentation apparatus and method which tie a process control computer (1) to valves used to adjust the mass flow of nebulized water and (2) to a light sensitive target or other device enabling measurement of any deformation of the housing, for executing process control logic to control the mass flow of nebulized water through the valves so that deformation in the gas turbine housing is minimized.

It is a further object of the present invention to provide a wet compression power augmentation apparatus and method which employ a material for depressing the freezing point of the water particles to help avoid icing in the compressor inlet.

It is a further object of the present invention to provide a wet compression power augmentation apparatus and method which can broadly be used with an axial compressor, a rotary-positive-displacement compressor, or a centrifugal compressor.

It is a further object of the present invention to provide a wet compression power augmentation apparatus and method which have a sensor to ascertain the presence of liquid at the discharge of the compressor.

It is a further object of the present invention to provide a wet compression power augmentation apparatus and method which can more particularly be used with a gas turbine system made of a gas turbine having an axial compressor and an inlet air duct whose flow axis is essentially aligned with the axis of rotation of the gas turbine rotor.

It is a further object of the present invention to provide a wet compression power augmentation apparatus and method which can be used with a gas turbine system made of a gas turbine having an axial compressor and an inlet air duct whose axis is essentially perpendicular to the axis of rotation of the gas turbine rotor.

It is a further object of the present invention to provide a wet compression power augmentation apparatus and method which provide for pre-filtering of the compressed air of the axial compressor section before it is used for cooling turbine section rotor blades so that plugging of cooling passages in the turbine section rotor blades will not occur.

It is a further object of the present invention to provide a wet compression power augmentation apparatus and method which can be readily installed in gas turbine systems which are presently in operation without requiring substantial maintenance, retrofit, or "tear-down" of the gas turbine engine.

SUMMARY OF THE INVENTION

To achieve the foregoing, the present invention provides a wet compression power augmentation method for adding water to a gas turbine, by nebulizing the water so that it is entrained in the inlet air to the compressor and is carried into the compressor for lessening the work of the compressor through latent heat intercooling, the means provided for so nebulizing the water being located, however, a sufficient distance from the compressor inlet such that any substantial element of the nebulizing means breaking away from the nebulizing means and being carried toward the compressor inlet will not enter the compressor inlet but be drawn by gravity to a lower surface of the gas turbine inlet duct, short of the compressor inlet.

In another aspect, a method is provided for nebulizing water near the inlet of the compressor as suggested in the known literature but adding the nebulized water to the inlet air in a plurality of water mass flow increments with respect to either position and/or time, so that operationally-induced thermal stresses within the gas turbine due to the use of the nebulized water are sufficiently minimized to preserve the structural integrity of the gas turbine.

It still another aspect, the water is both nebulized remote from the compressor inlet and added in a plurality of water mass flow increments with respect to either position and/or time.

Additionally, the present invention provides in the context of such a wet compression power augmentation method, an approach and method for detecting deformation in the housing of the gas turbine so that asymmetric cooling effects due to the use of the wet inlet air will not overly deform the aligned components of the gas turbine, especially as they relate to the gas turbine compressor housing.

Additionally, the present invention provides an approach and method for monitoring the temperature profile of fluid-cooled rotor blades in the turbine section where the combusted gas exchanges its kinetic energy with the rotor blades. The temperature profile of fluid cooled rotor blades is a measurement which helps to identify plugging which may result from minerals or other precipitate solids from the nebulized water in the compressor air stream being used to cool the turbine section rotor blades. The temperature profile is also useful in identifying damage which might occur on the surface of a multilayer turbine section blade from the erosive effects of water carried through the compressor into the turbine section or from precipitate solids in the compressor air stream.

Additionally, the present invention provides an approach and method for measuring the temperature in the compressor inlet to (1) guard against the possibility of icing occurring in the inlet to such a degree that this ice, if broken away, might damage downstream elements of the gas turbine, (2) minimize the use of freezing control materials such as either steam or a freezing point depressant, and/or (3) provide an input to a control system which is used to coordinate, monitor and/or control the overall wet compression apparatus and method.

Additionally, the present invention provides a viewport-based approach and method for monitoring icing in the compressor inlet.

Additionally, the present invention provides an approach and method for adding steam near the compressor inlet to counteract icing.

Additionally, and beyond simply adding sufficient steam to "counteract" icing, the present invention contemplates adding sufficient steam to the system to maintain a temperature in the inlet air stream so that icing in the axial compressor does not substantially occur.

Additionally, the present invention provides an approach and method for adding a material which depresses the freezing point of the nebulized water, and which, in an alternative or supplemental fashion, also counteracts icing.

Additionally, the present invention provides an approach and method for adjusting the nebulized water mass flow increments to minimize deformation and control the rates of expansion and contraction in the gas turbine housing with respect to the rotor.

The present invention provides a wet compression power augmentation apparatus made up of a spray rack group assembly.

Additionally, the present invention provides a wet compression power augmentation apparatus made up of a spray rack group assembly having at least one spray rack water pipe and at least one spray rack water nozzle.

Additionally, the present invention provides a wet compression power augmentation apparatus made up of a spray rack group assembly having at least one spray rack water pipe and at least one spray rack water nozzle and an associated restricting orifice.

Additionally, the present invention provides a wet compression power augmentation apparatus which uses a laser emitter and laser target measuring system mounted to the exterior of the housing for detecting deformation in the housing.

Additionally, the present invention provides a wet compression power augmentation apparatus which uses an optical pyrometer for monitoring the emitted energy of each of the cooled rotor blades through a sighting tube, and for characterizing the temperature profile of each of the fluid cooled rotor blades.

Additionally, the present invention provides a wet compression power augmentation apparatus which uses temperature sensors to monitor the temperature in the compressor inlet area to (1) guard against the possibility of icing occurring in the inlet to such a degree that this ice, if broken away, might damage downstream elements of the gas turbine or induce stall by starving the compressor, (2) minimize the use of freezing control materials such as either steam or a freezing point depressant, and/or (3) provide an input to a control system which is used to coordinate, monitor and/or control the overall wet compression apparatus and method.

Additionally, the present invention provides a wet compression power augmentation apparatus which uses a viewport positioned near the compressor inlet so that this area can be visually monitored for ice formation.

Additionally, the present invention provides a wet compression power augmentation apparatus which provides a steam dispersion assembly for adding steam near the compressor inlet.

Additionally, the present invention provides a wet compression power augmentation apparatus which provides a video camera positioned and focused to scan for ice buildup through the viewport.

Additionally, the present invention provides a wet compression power augmentation apparatus which provides at least one nozzle spray rack group assembly having a throughput which corresponds to one of the nebulized water mass flow increments in the plurality of nebulized water mass flow increments.

Additionally, the present invention provides a wet compression power augmentation apparatus which provides a process control computer executing process control logic to control the mass flow of nebulized water to the compressor inlet so that deformation in the gas turbine housing is minimized.

Additionally, the present invention provides a wet compression power augmentation apparatus for a gas turbine having an axial compressor and an inlet air duct whose axis is essentially perpendicular to the axis of rotation of the gas turbine rotor shaft.

Additionally, the present invention provides a wet compression power augmentation apparatus for a gas turbine having an an axial compressor and inlet air duct whose axis is essentially aligned with the axis of rotation of the gas turbine rotor shaft.

Additional features and advantages of the present invention will become more fully apparent from a reading of the detailed description of the preferred embodiment and the accompanying drawings, in which:

DETAILED DESCRIPTION OF THE DRAWINGS AND INVENTION

Figure 1:
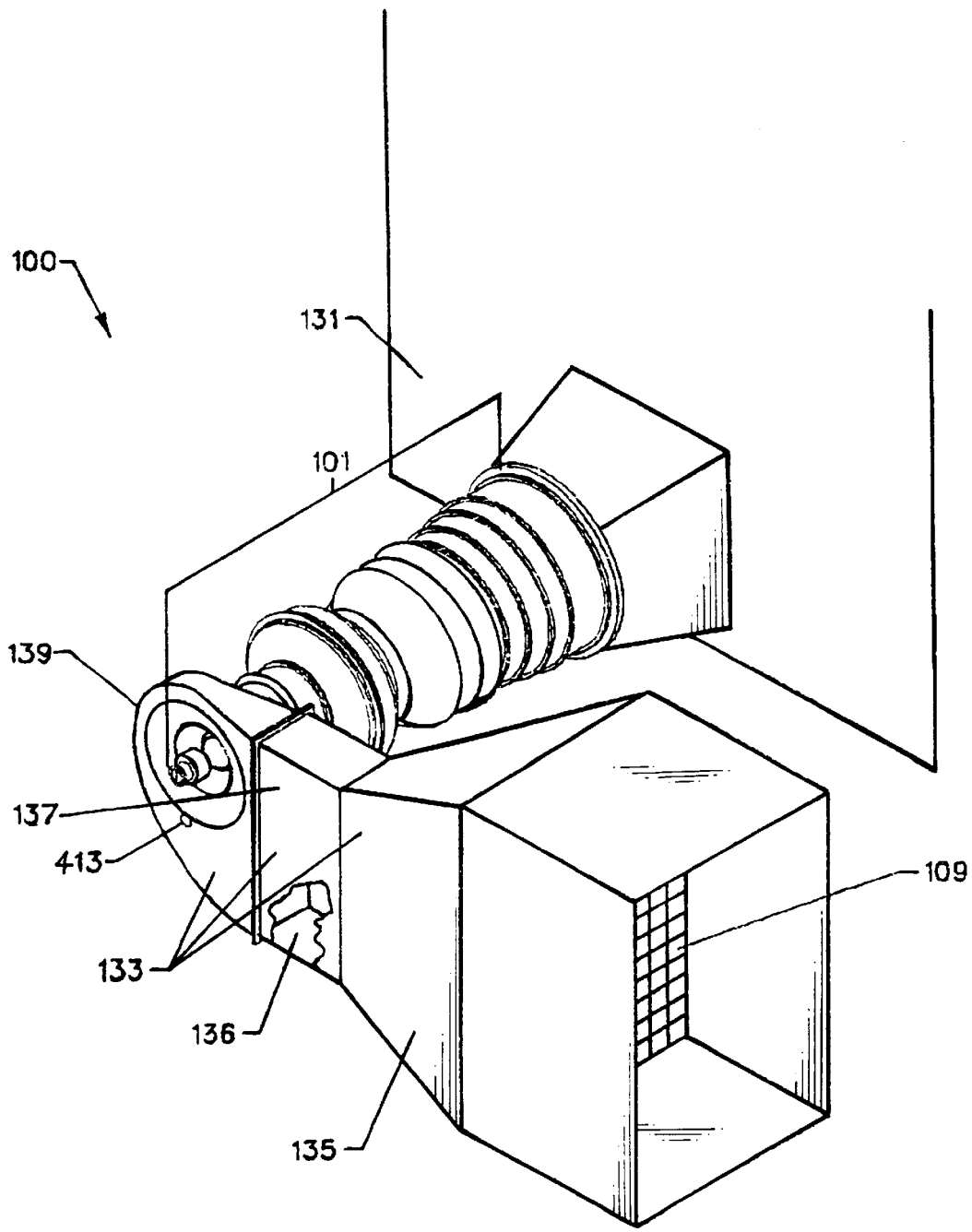
FIG. 1 shows an overview of a typical gas turbine power generation facility (the affiliated electric generator is not actually shown in FIG. 1, but is presumed to be apparent) used to generate electric power from the combustion of fuel with air.

The present invention and its utilities and advantages are truly best understood with reference to the operation of an otherwise conventional gas turbine power generation facility, such as shown in FIG. 1.

Turning now to FIG. 1, an overview is provided of a gas turbine power generation facility 100 used to generate electric power from the combustion of fuel with air (the affiliated electric generator is not actually shown in FIG. 1, but is presumed to be apparent). The gas turbine engine 101 acquires air from an inlet air filter 109 via an inlet air duct 133 connected between the inlet air filter 109 and the compressor inlet 102 (see FIG. 2). The inlet air duct 133 is made of an inlet air duct convergent portion 135, an inlet air duct constricted portion 137 (having a lower surface 136), and an inlet air duct manifold portion 139 with a viewport 413.

In some cases, a heat recovery unit 131 is used to generate steam from the turbine section exhaust gas. The steam generated by the heat recovery unit 131 can then be used to either generate electric power from a steam turbine, operate steam driven equipment, provide heat to chemical processing facilities, or the like.

Figure 2A:
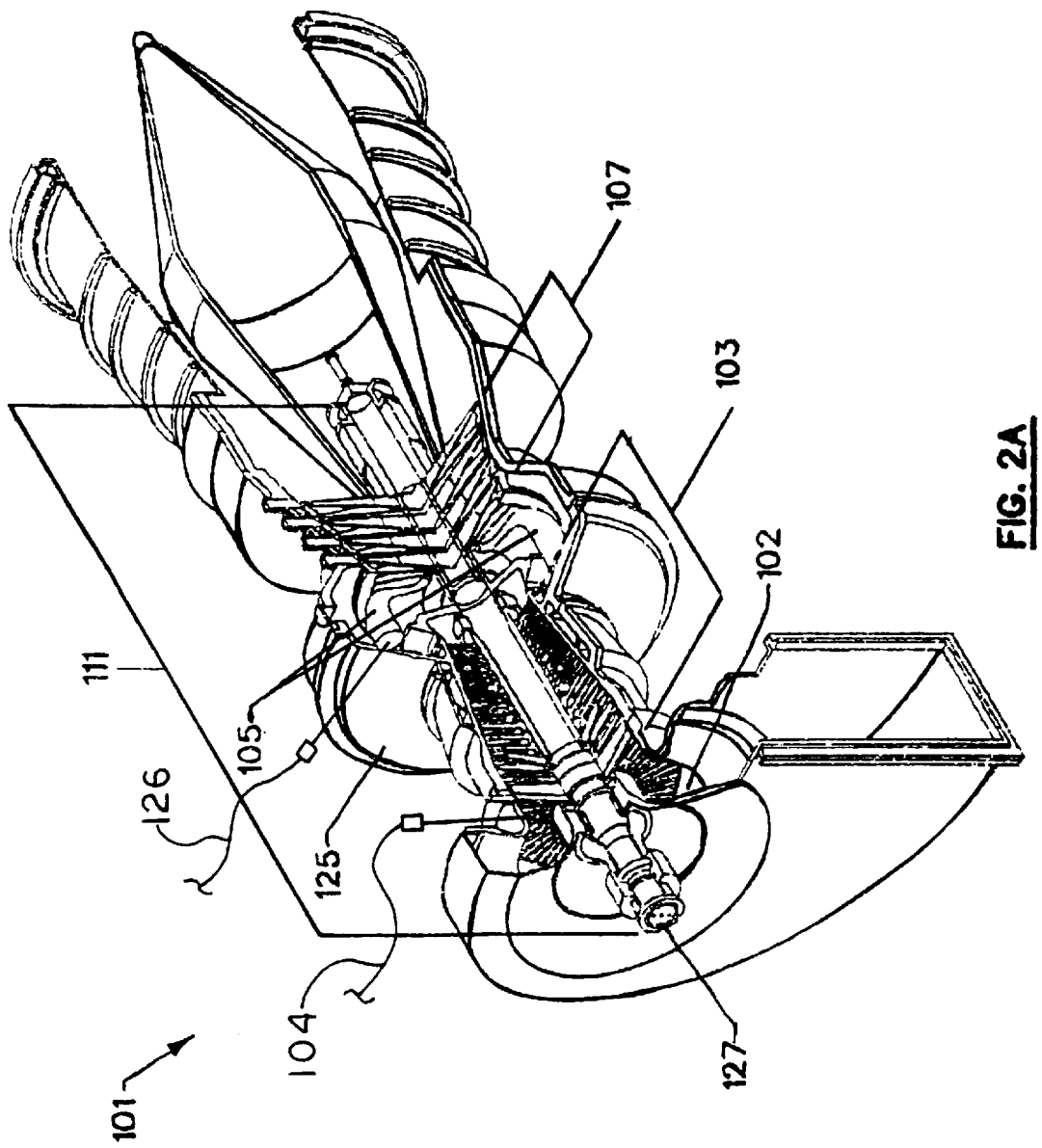
FIGS. 2A and 2B show details of a gas turbine engine having an axial compressor.
Figure 2B:
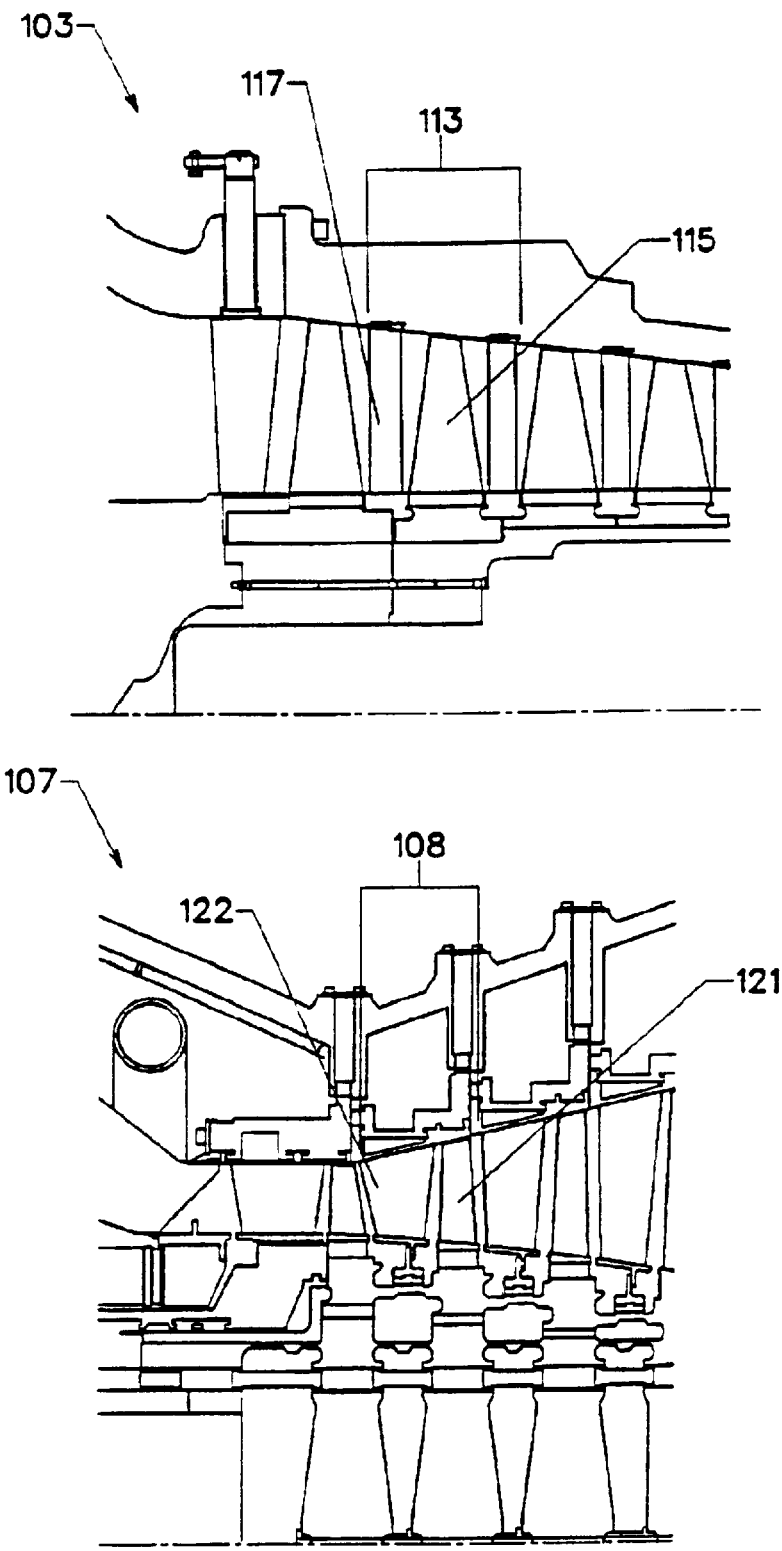

FIGS. 2A and 2B show further detail respecting gas turbine engine 101. After entering the compressor inlet 102, the air is compressed in the axial compressor section 103 by using a series of compressor stages 113. After compression, the compressed air then flows into combustion chambers 105 in the combustion section where it is mixed with fuel and the fuel is combusted to generate a hot pressurized gas for use in driving the turbine section 107. The turbine section 107 has a series of turbine section stages 108 which incrementally (1) convert the energy of the hot pressurized gas into work manifested as a rotating rotor 111 (preferably having coated components in the turbine section 107) and (2) generate an exhaust gas having a lower temperature and pressure than the hot pressurized gas which entered the respective turbine section stage 108. The exhaust gas from the first such turbine section stage 108 is then the hot pressurized gas for the second stage; the exhaust gas from the last stage is also the exhaust gas from the turbine section 107.

The rotor 111 is a part of both the turbine section 107 and the axial compressor section 103 and includes the rotor shaft 127 and the set of all rotor blades (115, 121) in both the turbine section 107 and the axial compressor section 103 mounted to rotor shaft 127. Rotor shaft 127 powers both the axial compressor section 103 and an electric generator or some other useful machine such as, without limitation, a large compressor used in chemical processing. In this regard, rotor shaft 127 is either a single structural component or, alternatively, a series of individual components which are mechanically attached together to form a virtual single structural component.

The various gases and fluids within the gas turbine engine 101 are generally contained by a housing 125 which defines an inner space of the gas turbine engine 101 to (a) channel the pre-compression air, (b) contain the compressed air in its progression through the sequential compressor stages 113, (c) provide a pressure shell to contain the compressor discharge around the combustion chamber(s) 105 in the combustion section, (d) contain the hot pressurized gas in which fuel has been combusted as it expands in the turbine section 107, and (e) channel exhaust gas while resident within the combustion engine 101. The housing 125 is usually constructed of several different pieces which are essentially connected together.

In axial compressor section 103, each compressor stage 113 is made up of a series of compressor rotor blades 115 mounted on the rotor shaft 127 and both the preceding and following sets of compressor stator blades 117 where, for each set, compressor stator blades 117 are mounted as a series in a radially disposed manner as a stationary blade row. The compressor stator blades 117 are (a) proximately fitted closely to the internal wall of housing 125 and (b) sealed to the rotor 111 (usually with labyrinth seals) in such a manner as to enable, in operation, an essential fluid isolation of one compressor stage 113 from its companion compressor stage(s) 113. The compressor rotor blades 115 and the compressor stator blades 117 collectively function to increase the pressure of air passing through compressor stage 113 by (1) transferring kinetic energy to the air (or gas flow) from the rotating compressor rotor blades 115 and (2) channeling the air flow, which results in a pressure and temperature rise in the air as the air is decelerated by the compressor stator blades 117 following the compressor rotor blades 115. The pressure ratio of exit pressure to inlet pressure in one compressor stage 113 is limited by intrinsic aerodynamic factors, so several compressor stages 113 are usually required to achieve a higher overall pressure ratio for the axial compressor section 103 than could be achieved by a single axial compressor stage 113.

After addition of fuel in the combustion chamber(s) 105 of the combustion section and oxidation of the fuel by the oxygen within the compressed air, the resultant hot pressurized gas is converted into work within turbine section 107 by expansion; this process is achieved by transferring the high kinetic energy from the hot pressurized gas to the turbine section rotor blades 121 in a series of turbine section stages 108.

Each turbine section stage 108 is made up of a series of turbine section rotor blades 121 mounted on the rotor shaft 127 and the preceding set of turbine section stator blades 122 which are mounted as a series in a radially disposed manner as a stationary blade row. The turbine section stator blades 122 are (a) proximately fitted closely to the interior wall of housing 125 and (b) sealed to the rotor 111 (usually with labyrinth seals) in such a manner as to enable, in operation, an essential fluid isolation of one turbine section stage 108 from its companion turbine section stage(s) 108. The turbine section rotor blades 121 and the turbine section stator blades 122 collectively function to incrementally decrease the pressure of the hot pressurized gas by (1) channeling the hot pressurized gas and (2) transferring kinetic energy from the hot pressurized gas to the rotating turbine section rotor blades 121, producing work which is manifested in the rotation of the rotor 111 as it drives its load.

Figure 7:
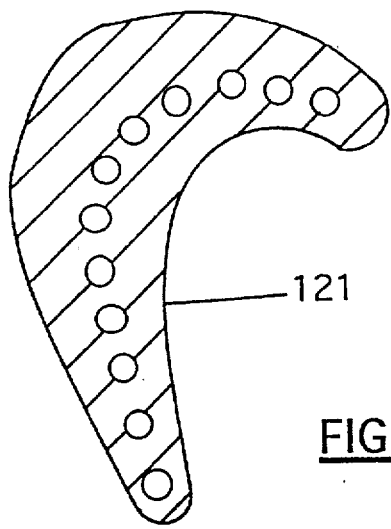
FIG. 7 is a cross-sectional view of a fluid-cooled turbine section rotor blade with a machine or cast tube or cavity section defined therein.

In some cases, the turbine section rotor blades 121 have multilayered surfaces or coated surfaces to enable the use of higher temperature hot pressurized gas; in some cases the turbine section rotor blades 121 have (or, alternatively, can also have) cooling provided within the turbine section rotor blades 121 through use of a machined or cast tube or cavity section within the turbine section rotor blades 121, as more particularly shown in the cross-sectional view of FIG. 7. During operation, the machined or cast tube or cavity section is in fluid communication with (a) compressed air from the axial compressor section 103 and (b) a reduced pressure discharge for exit of the compressed air; the compressed air flows through the machined or cast tube or cavity section which is positioned inside of each individual turbine section rotor blade 121 to cool that turbine section rotor blade 121.

As will be noted in another part of this specification, the use of such cooling systems for each turbine section rotor blade 121 can be most effective if measurements of the individual turbine section rotor blade 121 surface temperatures are used to identify possible plugging within the machined or cast tube or cavity section of any blade, as such plugging can restrict the flow of coolant and result in an unacceptably high temperature on an individual turbine section rotor blade 121. In a gas turbine engine 101 using the present invention, such plugging could be causes by trace mineral precipitates (from the entrained nebulized or particulated water) in compressor discharge air used to cool the turbine section rotor blades 121.

Figure 9:
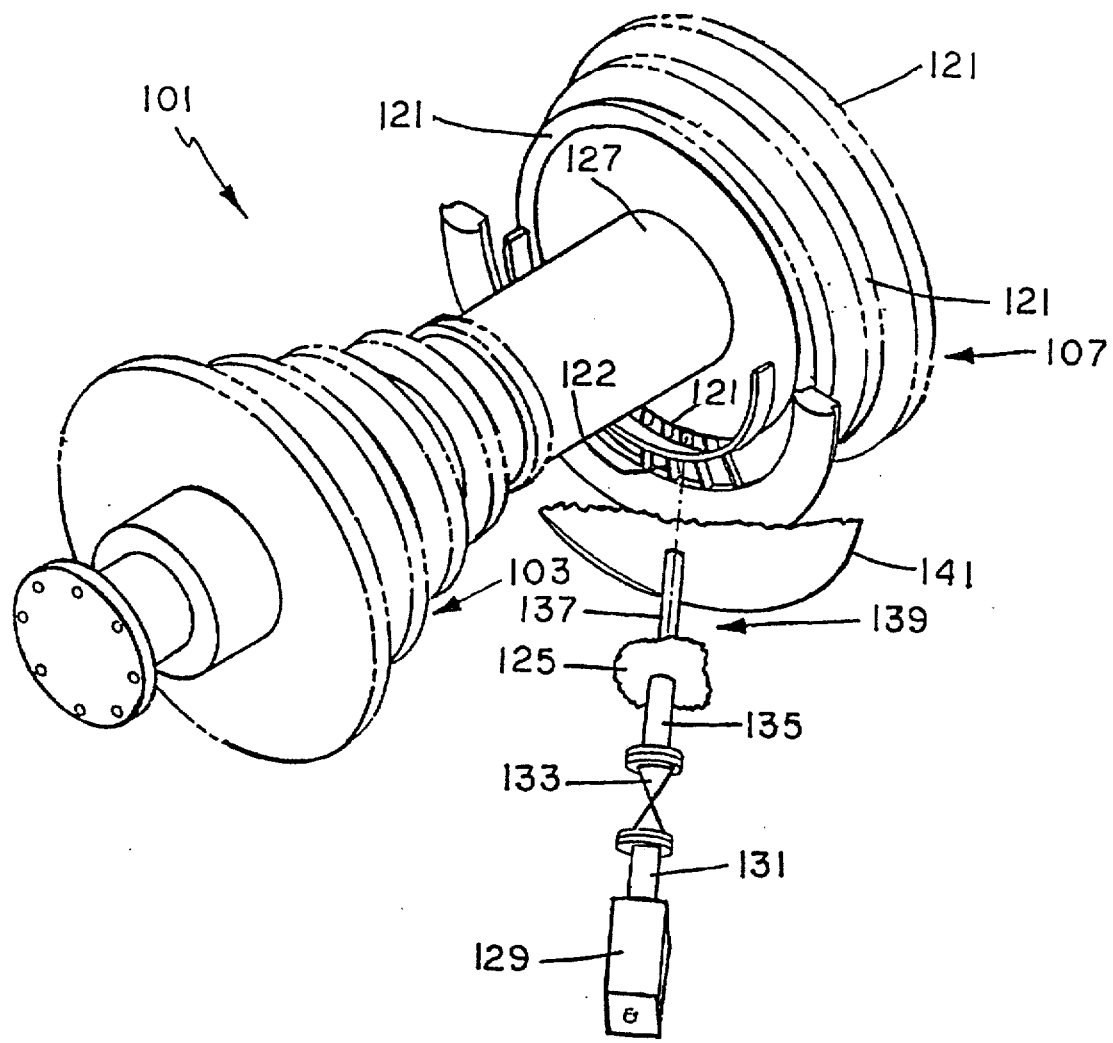
FIG. 9 is a partial isometric view of a turbine, schematically illustrating an optical pyrometer connected to a sight tube assembly in the manner of U.S. Pat. No. 4,648,711.

The preferred method for keeping such material from entering the cooling system for the turbine section rotor blades 121 is to provide for comprehensive pre-filtering of the compressed air of the axial compressor section 103 before it is used for cooling the turbine section rotor blades 121 and for measurement of representative individual turbine section rotor blade 121 surface temperature profiles to reasonably confirm that the blades 121 are adequately cooled. A preferred system for performing such measurements of individual turbine section rotor blade 121 surface temperatures is described in U.S. Pat. No. 4,648,711 issued on Mar. 10, 1987 to Richard E. Zachary and entitled "Sight Tube Assembly and Sensing Instrument for Controlling a Gas Turbine", and is shown in FIG. 9 (which substantially reproduces FIG. 1 of the '711 patent, but for the reference numbers employed therein in relation to turbine elements described in this specification.) This patent is expressly incorporated herein by reference into this specification.

With reference now to FIG. 9, and as more particularly described in the '711 patent, an optical pyrometer unit 129 is shown with a tubular member extending from the unit 129 and defining a coupler neck 131. The flanged end of the coupler neck 131 is connected to one of the flanged ends of a valve 133. A sight glass (pressure seal) is sandwiched between the flanged ends of the coupler neck 131 and valve 133.

The pyrometer unit 129 and sight glass can be isolated from the environment of the turbine section 107 by closing valve 133. Suitable valves are those in which there is a clear line of sight through the valve bore when the valve 133 is in an open position. Examples of such valves are gate valves, ball valves and plug valves.

The sight tube assembly paired with the optical pyrometer unit 129 is made up of the sight tube 137 and a tubular member which defines a nozzle 135. The front end of the nozzle 135, which is flanged, fastens to the flanged end of valve 133, which is opposite from the coupler neck 131. The opposite end of the nozzle 135 (not flanged) is fastened to the turbine housing 125. The sight tube 137 fits inside the nozzle 135, and the flange on the front end of this tube is clamped between the flanged ends of the nozzle and valve. The outside diameter of the sight tube 137 is slightly smaller than the inside diameter of the nozzle 135, such that an annular space is defined between the sight tube 137 and nozzle 135.

The lower end of sight tube 137 extends through a hot gas duct member 141, and is preferably flush with the inside surface of the duct member 141. The sight tube is positioned in front of the first set of turbine section stator blades 122 in the first turbine section stage 108, such that a line of sight is established directly from the pyrometer unit 129 through the sight glass, the valve 133 (in open position) and the sight tube 137 to the first row of the turbine section rotor blades 121 carried on the rotor shaft 127. In this manner, the pyrometer unit 129 is thus positioned to continuously monitor the temperature of the blades 121.

It should be further noted that best results from pyrometry used in conjunction with wet compression will be achieved if a pyrometer sensitive to a frequency of 3.9 microns is used in conjunction with a pyrometer sensitive at 0.95 microns; this avoids infrared emissions from the water vapor carried into the turbine section 107 which would confound pyrometry measurements performed only at 0.95 micron sensitivity.

Comprehensive pre-filtering of the compressed air delivered from the axial compressor section 103 before it is used for cooling the turbine section rotor blades 121 is suggested, through use of a filter interposed between the discharge of compressed air which is to be used for cooling the turbine section rotor blades 121 and the inlet tube which fluidly communicates the compressed air to each cooled turbine section rotor blade 121.

Figures 3, 3A:
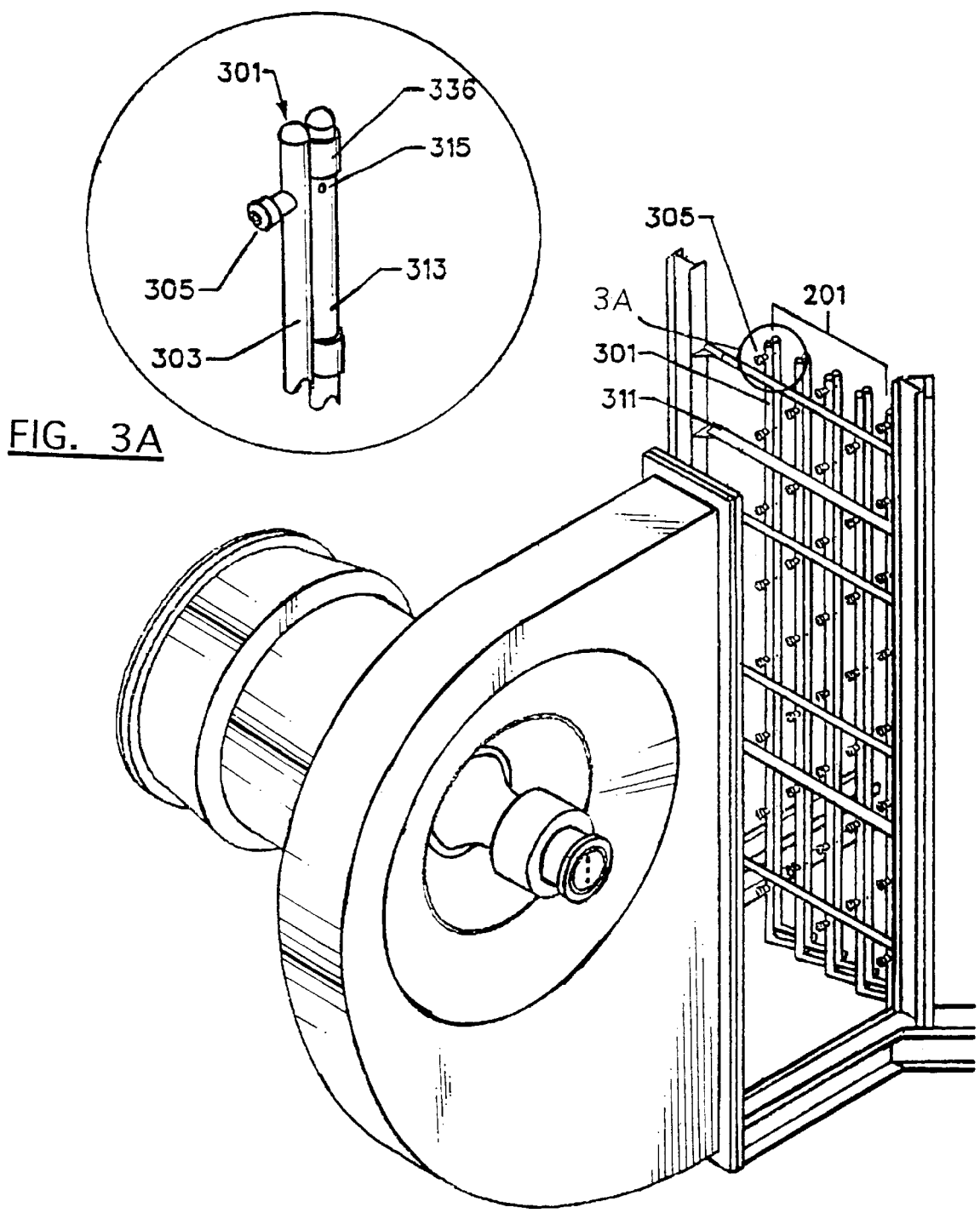
FIG. 3 shows the positioning of a spray rack group assembly used in the gas turbine power generation facility of FIG. 1. Affiliated steam pipes are also shown.
FIG. 3A is an enlarged view of details of the spray rack group assembly and steam pipes.

FIG. 3 now shows the positioning of the spray rack group assembly 201 used in the present invention in the gas turbine power generation facility 100. The spray rack group assembly 201 can be positioned anywhere between the inlet air filter 109 and the compressor inlet 102, but it is preferably inserted into the inlet air duct 133 in the inlet air duct constricted portion 137 after the inlet air duct convergent portion 135.

This positioning has benefits in that sufficient separation from the compressor inlet 102 is provided so that a nozzle 305 (or other damaged part of either the steam addition system or spray rack group assembly 201) which might become detached from spray rack group assembly 201 will be gravitationally pulled to the lower surface 136 of inlet air duct 133 before the nozzle 305 (or damaged part) is pulled into the rotating rotor 111.

In one embodiment, the details of which are shown most clearly in FIG. 3A, the spray rack group assembly 201 is made up of a group of individual spray racks 301, where each individual spray rack 301 is made of a spray rack water pipe 303 with a group of spaced spray rack water nozzles 305 for nebulizing the water which is sent through the spray rack water pipe 303. In another embodiment (not shown) where, for instance, the axis of inlet air flow in the inlet air duct 133 is aligned with the axis of the rotor 111, the nozzles are more effectively disposed on a circularly-, elliptically-, or ovally-shaped water pipe.

Additionally, a spray rack steam pipe 313 with spray rack steam hole(s) 315 is provided to add steam heating to the inlet air. Mounting sleeve(s) 336 are periodically employed on each spray rack steam pipe 313 to provide free movement during thermally induced expansion and contraction of the spray rack steam pipe 313.

Preferably very clean water, for example, water having a conductance of about 0.4 micromhos or less with no particulates, whether as condensate water or distilled, deionized water, is in this manner nebulized (or atomized) to form a very fine spray or fog of water. A number of nozzle designs could be employed for providing this very fine water spray, with a 1-7N-316SS12 nozzle from Spraying Systems Co. (P.O. Box 7900, Wheaton, Ill., 60189) being preferred in the gas turbine systems on which the present invention has been demonstrated to date for providing a spray characterized by a volume mean diameter of 153 microns (2 gallon per minute flow rate) at a pressure drop of 80 psig and a temperature in the range of 45 to 165 degrees Fahrenheit. An alternative 1-7N-316SS16 nozzle from Spraying Systems Co. provides a spray characterized by a volume mean diameter of 188 microns (2.6 gallon per minute flow rate) at a pressure drop of 80 psig and a temperature in the range of 45 to 165 degrees Fahrenheit.

With further regard to the water used and the aforementioned risks which have heretofore been associated with the use of wet compression power augmentation, very pure water can negatively impact the components of the gas turbine engine 101 insofar as critical chemical elements vital to alloyed materials used in the construction of gas turbine engine 101 can be leached, by the very pure water, from the affiliated components and thereby detrimentally alter the beneficial properties of the alloyed materials; in this regard, technically ideal water results, for example, from a process where extremely pure water is passed through a facilitative mass transfer system. An example of such a facilitative mass transfer system is where the pure water is passed over beads of chemical elements which are compositionally balanced so that the resulting water stream contains sufficient quantities of each critical alloying element respective to the materials of construction of the components of gas turbine engine 101, so that the resulting water stream sufficiently minimizes the effects of leaching with regard to critical and vital chemical elements in the alloyed components of the gas turbine engine 101 that the integrity of those components is properly preserved as wet compression is executed.

While it is presently contemplated that the water mass can be added through the spray racks 301 and associated spray nozzles 305 at a constant rate or in a ramped or smoothly increasing or decreasing rate, preferably the water to be added therethrough will be added or removed, as the case may be, in a plurality of water mass flow increments. With respect to the use of nozzles 305, each individual spray rack 301 can in this regard be said to generate a nebulized water mass flow increment, since the set of spray rack water nozzles 305 in the individual spray rack 301 will operate with an incremental output determined by the pressure drop across the set of spray rack water nozzles 305. Each nozzle 305 will generally have a range of pressures over which a particular fluid can be properly nebulized given an adequate supply of the fluid being nebulized, but the spray rack water nozzle 305 employed in the present invention should effectively provide an essential increment of water mass flow in the form of a very fine spray or fog at a given pressure drop for water at a given temperature. In this regard, the smallest increment of water mass flow is then the increment of water mass flow needed to activate the smallest nozzle 305 which might be deployed in facilitating wet compression.

As should be apparent, if the water mass flow were, in either a continuous flowrate or incremental flowrate manner of operation, to be modified to decline below the minimum water mass flow needed to achieve the generation of acceptable spray for entrainment and mixing into the inlet air, then the water being added would not become entrained but would be swept as an unnebulized water mass into the compressor inlet 102 in a non-uniform pattern. The negative effects of the unnebulized water mass being swept into the compressor inlet 102 in a non-uniform pattern relate to the distortion concern and to a more rapid erosion of components subject to impact of the unnebulized water mass. With respect to the range of pressures over which a fluid can be reasonably nebulized, some continuous analog adjustment in the amount of flow can be facilitated by modifying the delivery pressure, but the effect of these modifications on attributes of the spray from the nozzles 305 needs to be considered as this is implemented. This approach to adjusting mass flow of liquid has some use, however, in fine-tuning the spray delivery after wet compression has been essentially established.

If the pressure is controlled to the spray rack water pipe 303, a group of spray rack water nozzles 305 connected to that spray rack water pipe 303 will operate to process a general increment of water mass flow equal to the sum of the individual spray rack water nozzle 305 mass flow increments.

In an alternative embodiment, each individual spray rack water nozzle 305 may be separately valved and controlled to provide a maximum number of controllable water mass flow increments, with each increment being the essentially predictable and constant flow where the spray rack water nozzle 305 will deliver its functionally suitable spray pattern at the pressure drop available.

In yet another embodiment, a group of spray rack water pipes 303, each having an associated spray rack water nozzle 305 set controlled at the spray rack water pipe 303 level, may be mixed with other spray rack water nozzles 305 which are individually controlled.

It should be apparent from the above that a number of different arrangements of nozzles and pipes can achieve the provision of mass flow of nebulized water in a plurality of nebulized water mass flow increments. In some cases also, the spray rack water nozzles 305 may be of different sizes to enable either pre-defined spray concentration profiles from a particular spray rack water pipe 303 or to facilitate passage and flushing of particulates from within a particular spray rack water pipe 303 to avoid clogging of any spray rack water nozzle 305. In this regard, the internal clearances on larger throughput nozzles 305 can accommodate the passage of particulates more readily than the internal clearances on smaller throughput nozzles 305.

With regard to the enabling of established and predictable spray concentration profiles as well as the provision of a very fine water spray or fog (as opposed to a coarse infusion of water) into the compressor inlet 102, what is sought is a very uniform (with respect to the compressor inlet 102) dispersion or distribution of water that permits a desired amount of water to be added while controlling compressor operation transients and minimizing distortions in the housing 125 due to uneven water-cooling effects through an uneven or non-uniform distribution of the significant water added through the nozzles 305. Depending on the positioning of the spray rack group assembly 201 and the manner in which water is thus added for a particular gas turbine engine 101, it will be appreciated that a uniform sizing and distribution of the nozzles 305 across a cross-section of the inlet air duct 133 occupied by the spray rack group assembly 201 may not be best for accomplishing the desired uniformity in the nebulized water flow to the compressor inlet 102. Rather, the optimum arrangement can appropriately be determined through observation of the effect of various arrangements for various incremental additions of water on distortion of the housing 125.

To expand upon a feature or aspect mentioned previously, the spray rack group assembly 201 is preferably, irrespective of whether spray rack group assembly 201 is operated (a) via a method where the water mass flow is modified in a continuous flowrate manner or (b) via a method where the water mass flow is modified in an incremental flowrate manner of operation, positioned essentially in the inlet air duct constricted portion 137 and with sufficient separation from said compressor inlet 102 such that, in operation, any spray rack water nozzle 305 (or any other damaged portion of the spray rack group assembly 201) which breaks away from the spray rack group assembly 201 will be gravitationally pulled to the lower surface 136 of inlet air duct 133 before the spray rack water nozzle 305 (or damaged portion) is pulled into the compressor inlet 102 and/or rotating rotor 111 by forces derived from pressure and flow attributes within inlet air duct 133. The reason for positioning the spray rack group assembly 201 in the inlet air duct constricted portion 137 instead of in the inlet air duct convergent portion 135 is that the velocity of the inlet air stream is generally higher in the inlet air duct constricted portion 137 than in other parts of inlet air duct 133, and the nebulized water from the spray rack group assembly 201 will, as a consequence, generally be more effectively entrained into the flowing inlet air stream.

FIG. 4 shows further details for the layout of the spray rack group assembly 201 shown in FIG. 3, showing, in an elevation view, the relative location of individual spray racks 301, the positioning of each spray rack water nozzle 305, and the use of spray rack stiffeners 311. In this regard, the dimensions and connections for spray rack stiffeners 311 are confirmed empirically to define a stable system which will be structurally robust. A system which can also be used to monitor the spray rack group assembly 201 for overall integrity during operation is a spray rack vibration monitor 411, for detecting unacceptable resonance in the assembly 201.

Figure 4:
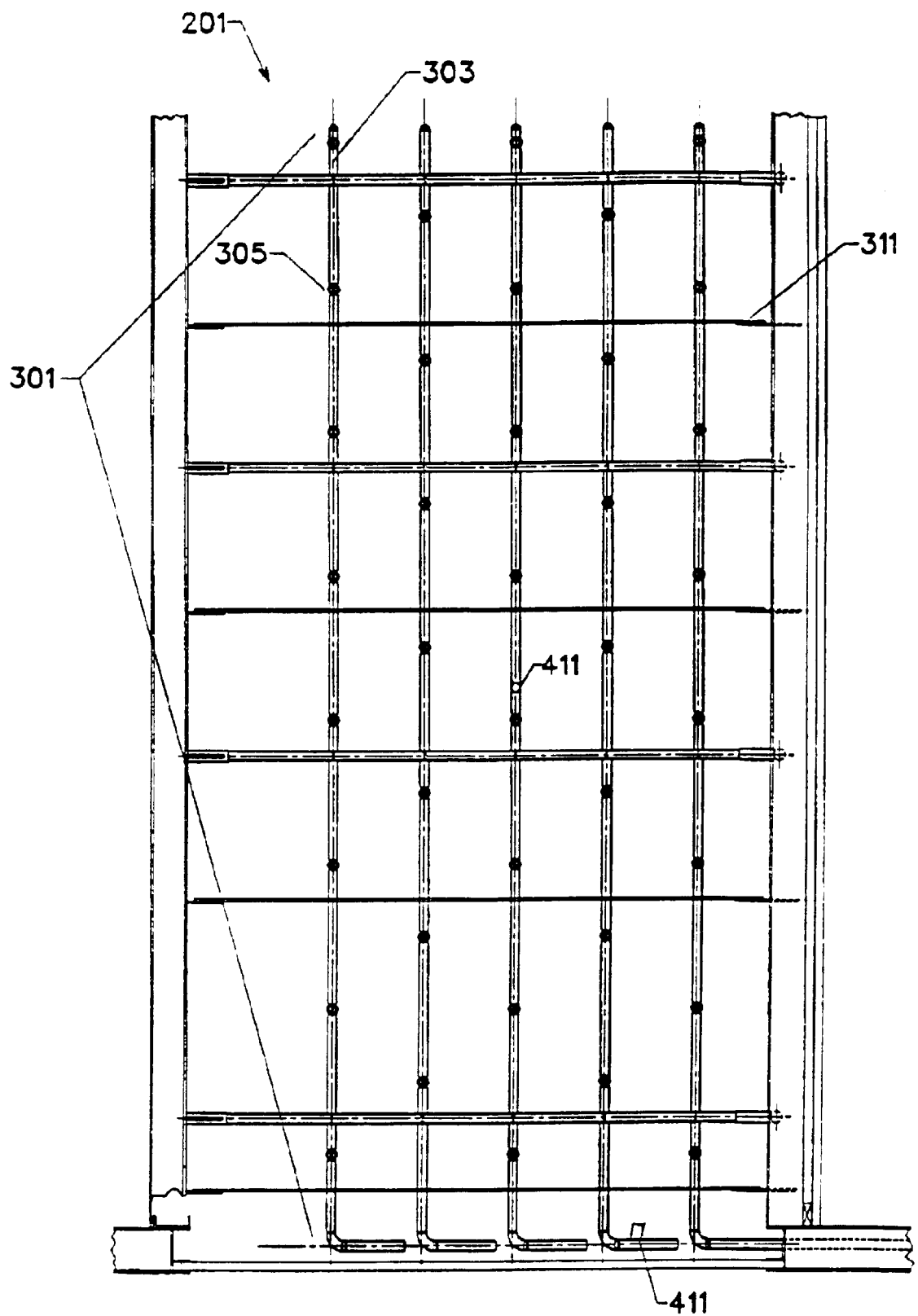
FIG. 4 shows further details for the layout of the spray rack, showing an elevation view of the relative location of individual spray rack water pipes, the positioning of each spray rack water nozzle, and the use of spray rack stiffeners.
Figure 5:
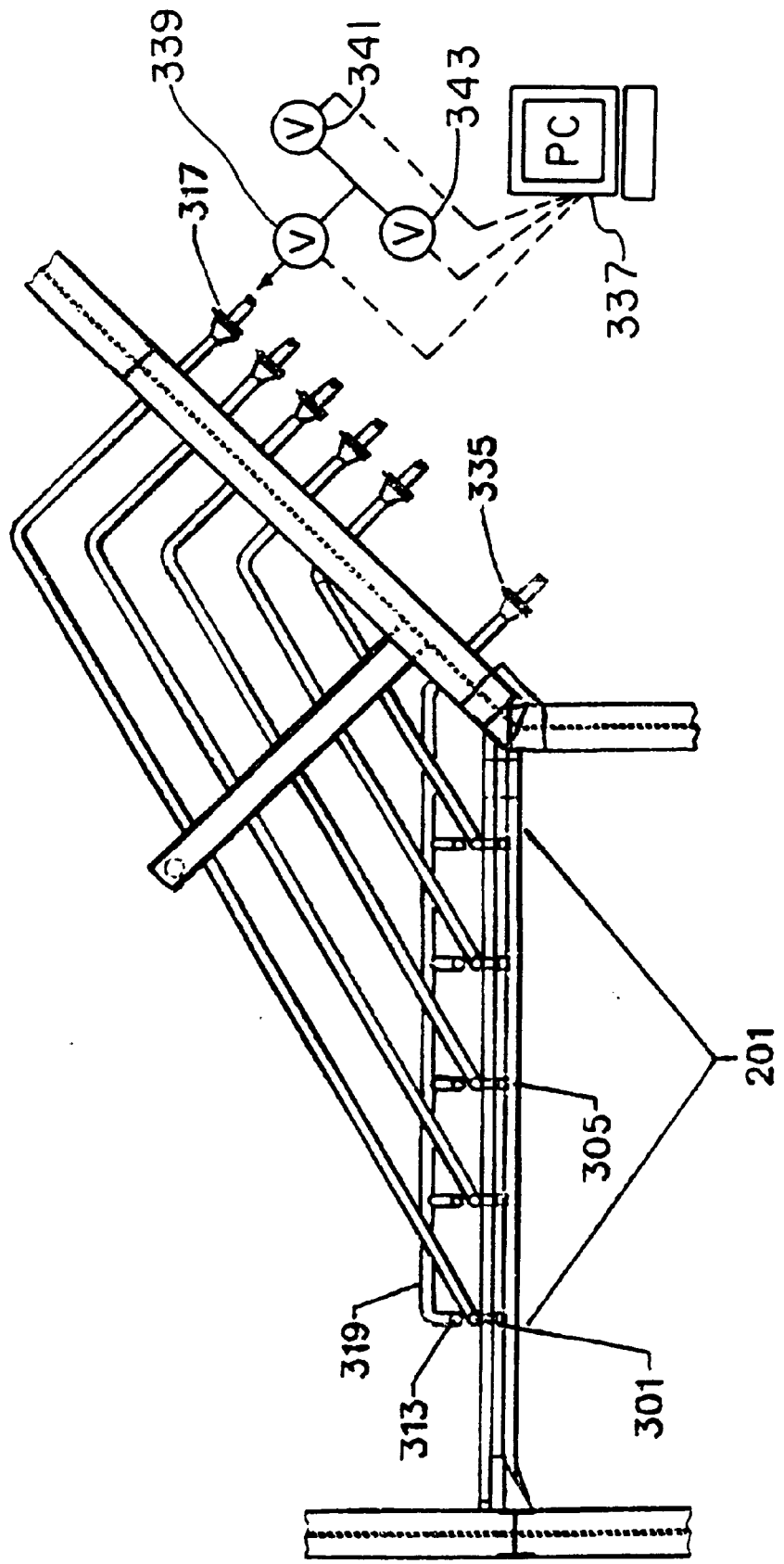
FIG. 5 is a plan view showing details of the spray rack assembly of FIGS. 3 and 4 with a steam manifold for feeding steam to the steam pipes.

FIG. 5 shows plan view assembly details of the spray rack assembly of FIGS. 3 and 4. Steam is added to the spray rack steam pipes 313 via steam manifold 319. The steam is added in the embodiment of FIGS. 3, 4, and 5 to provide steam sufficient to achieve a temperature in the inlet air which is above a point where water in the air freezes in the compressor inlet 102. At least one steam hole 315 is used for each spray rack steam pipe 313, although a preferred construction is that about 5 steam holes 315 are provided for each spray nozzle 305; these steam holes 315 are equally dispersed along each steam pipe 313. Generally, it is expected that the compressor inlet 102 will be most susceptible to icing due to cooler inlet air proceeding along or being channeled along the walls of the housing 125 in the vicinity of the compressor inlet 102, and so preferable sufficient steam will be provided by means of the pipes 313 or by other, supplemental means at the periphery of the inlet air duct constricted portion 137 to prevent icing from occurring in this matter.

In order to further assure that the gas turbine engine 101 is not adversely affected by any inrush of liquid which will result if any spray rack water nozzle 305 should become detached from its spray rack water pipe 303, a restricting orifice 317 (which is sized to limit the throughput of water in the respective spray rack water pipe 303) is preferably inserted into the source feed line for the spray rack water pipe 303. A steam flow restricting orifice 335 also restricts the amount of steam added in case of any breakage in the steam delivery system.

It is important to manage the inlet air temperature at the compressor inlet 102 to prevent the water added and entrained in the inlet air from freezing on surfaces in the vicinity of the inlet guide vanes of the compressor. Ice may starve the compressor into surge or may break free and encounter the rotating blades 115 in the axial compressor section 103.

The temperature in the compressor inlet 102 is preferably monitored with at least one temperature sensor sensor element 104 in FIG. 2A to help identify the proper amount of steam that needs to be added to the inlet air; in the case of essentially pure water, the inlet air temperature should generally be maintained above about 45 degrees Fahrenheit to assure that icing will not be induced by adiabatic expansion in the compressor inlet 102.

In the absence of the heating provided, for example, through the addition of the steam via steam holes 315 or by other means, it will be appreciated that this temperature limit effectively places an ambient temperature constraint on gas turbines employing the wet compression technology of the present invention with pure water addition. However, the heating provided through steam addition (generated in an added heat recovery unit 131 for a gas turbine power generation facility 100 operating in simple cycle or from low-pressure steam available in a facility operating in combined cycle) enables utilization of the present invention at considerably lower ambient temperatures.

With particular regard to a combined cycle operation with inlet air evaporative cooling, additional, presently unutilized heat may additionally be recovered and beneficially applied for inlet air heating purposes by cross-exchanging the condenser heat from the steam turbines to the inlet air evaporative cooler (not shown) for purposes of inlet air heating and humidification (effectively turning the inlet air evaporative cooler into an inlet air evaporative heater/humidifier), such that, with added steam injection (or, possibly, without steam injection), operation of the wet compression technology of the present invention should be enabled at ambient temperatures well below 45 degrees Fahrenheit—certainly as low as about 15 degrees Fahrenheit, although the practical lower temperature operating limits are more appropriately determined on a case-by-case basis.

Figure 8:
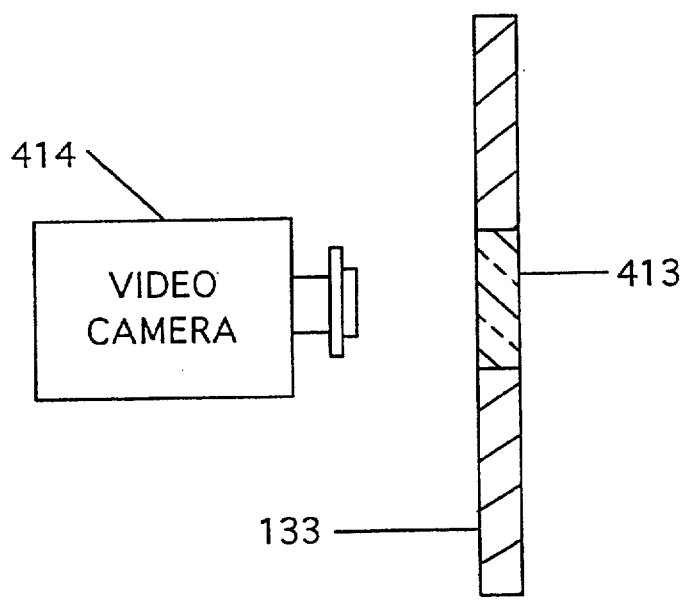
FIG. 8 illustrates the use of a videocamera for monitoring for icing in the turbine's compressor inlet.

An additional safeguard against potentially destructive icing occurring at the compressor inlet 102 is preferably provided by placing at least one viewport 413 in the wall of the inlet air duct manifold portion 139 which enables viewing and scanning for ice buildup by an operating technician. If such a viewport 413 is used, as depicted in FIG. 8 the use of a video camera 414 can further simplify the information gathering process by enabling an operating technician to have a convenient visual of the interior of the inlet air duct 133 and/or compressor inlet 102 on a video screen monitor. In this regard, the water mass flow may need to be reduced or interrupted to facilitate a full visual examination of that part of the interior of inlet air duct 133 and/or compressor inlet 102 which can be viewed from viewport 413. An optional further anti-icing enhancement to the system providing water to spray rack group assembly 201 is to also mix a material into the water stream which depresses the freezing point of the water particles. In this regard, freezing point depressants such as methanol can be used to provide for a lower working temperature in the inlet air.

Figure 6:
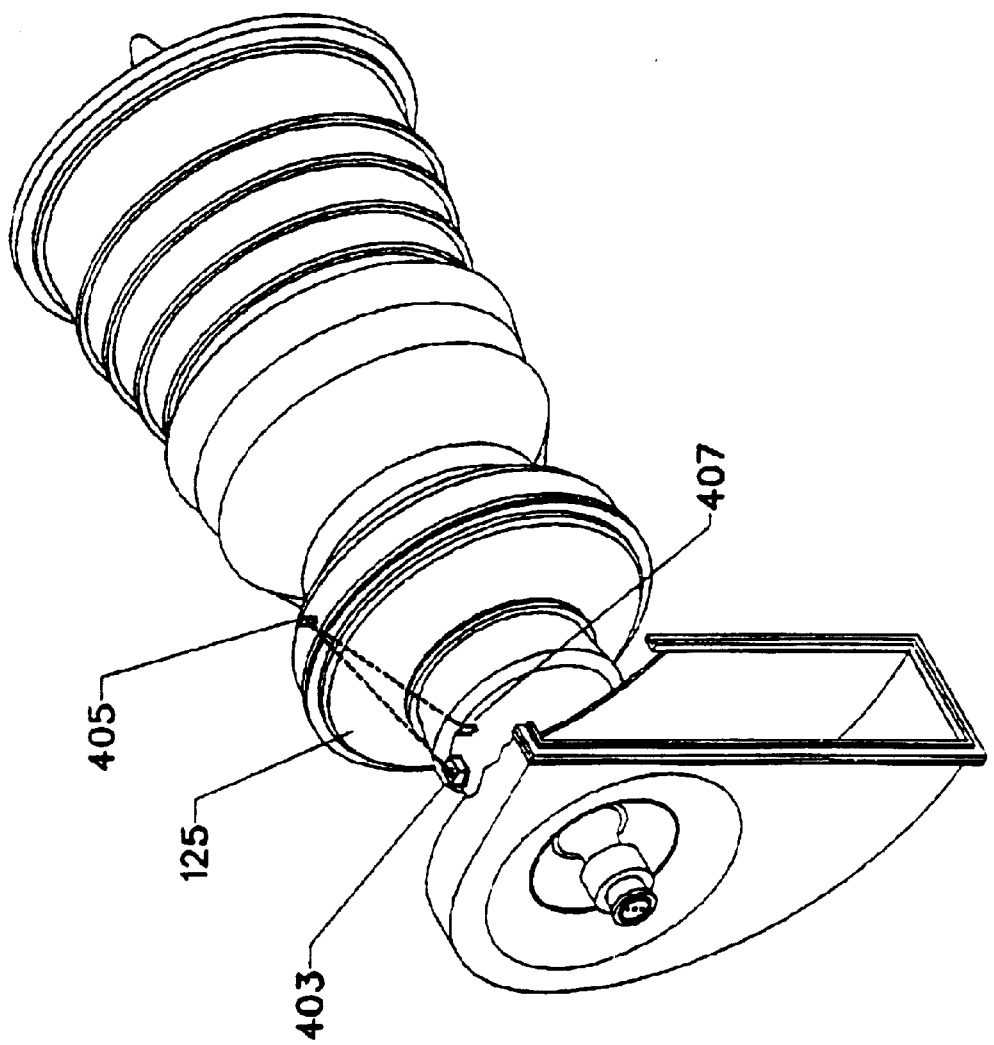
FIG. 6 presents details for monitoring for deformation of the housing of the gas turbine engine system shown, for example, in FIGS. 1 and 2.

FIG. 6 presents details for monitoring deformation of the housing 125 of the gas turbine engine 101. In this regard, the addition of a substantial mass of nebulized water into the air being processed by the axial compressor section 103 can, as previously indicated, have a detrimental effect on the gas turbine engine 101 because of cooling effects which may not be symmetrical with respect to the inner surface (inner perimeter, inner wall) of the portion of the housing 125 containing the axial compressor section 103. If one portion of the housing 125 is cooled unequally with respect to another portion, then the housing will be distorted from the necessary symmetrical alignment. Such distortion can precipitate the disruption of internal fluid flows in the axial compressor section 103 inducing a stall or a rotating stall leading to destructive stresses in the components of the axial compressor section 103, or such distortion can induce mechanical rubbing between components of the axial compressor section 103, resulting in either damage to these components or a compressor wreck.

FIG. 6 shows the use of a laser emitter 403, a laser reflector 405, and a laser target 407 to achieve monitoring of distortion in the housing 125. It should be noted that the use of the laser reflector 405 is to provide response to angular distortion, and a series of laser reflectors 405 can be used as desired to further enhance the sensitivity of the assembly to distortions of the housing 125 by effectively multiplying the angular displacement and distance that the laser beam emitting from the laser emitter 403 will undergo prior to registering upon the laser target 407. In a less sensitive deployment of the laser, no laser reflector 405 is used. In a preferred embodiment of the invention, a single laser reflector 405 is considered acceptable for axial compressor sections 103 of traditional length (in some emergent designs, however, a more sensitive arrangement may be best). Multiple sets of laser emitters 403, laser reflectors 405 and laser targets 407 can be used to monitor the distortion of different portions of the housing 125, or the beam from the laser emitter 403 can alternatively be split, using a partially reflective mirror (not shown), and then directed to different laser reflectors 405 mounted on different parts of the housing 125 for sensing by different laser targets 407, each directed to monitoring distortion of a different part of the housing 125.

The non-symmetrical cooling effects of the housing 125 are additionally of concern when the gas turbine power generation facility 100 has an inlet air duct 133 attached to the housing 125 with an inlet air duct constricted portion 137 (the preferred location for the spray rack group assembly 201), where the axis respecting the the inlet air duct 133 (said axis being defined as the continua of the general fluid flow and flux cross-sectional midpoints aligned with the direction of general fluid flow and flux in the duct) is essentially perpendicular to the axis of rotation for the rotor 111 (as is shown in FIG. 1). In this case, the rotor shaft 127 may rotate within a tunnel transversing and suspended within the inlet air duct compressor inlet manifold portion 139; the tunnel constitutes a fluid-flow obstacle which, along with the essentially right angled fluid flow directional change induced by the perpendicular inlet duct axis with respect to the rotor axis, disrupts the equal and symmetrical distribution of nebulized water in the inlet air stream.

As discussed previously, the positioning, water mass increment definition and sizing of individual spray rack nozzles 305 and spray rack water pipes 303 are preferably designed in this instance to provide a sufficiently symmetrical and uniform cooling of the housing 125 that the housing 125 will not be unacceptably distorted. The modification of the mass flow of nebulized water to the compressor inlet 102 via a plurality of nebulized water mass flow increments is then done in operation so that operationally-induced thermal stresses within the gas turbine engine 101, due to the use of the modified mass flow of nebulized water, are sufficiently minimized to preserve the overall structural integrity of the gas turbine engine 101. In this regard, temperature shocks due to very rapid modification of the mass flow of nebulized water to the compressor inlet 102 can induce cracking in certain alloyed components within the gas turbine engine 101 if the surface termperature of the component is rapidly decreased (inducing thermal contraction in the surface portion of the component) while the remainder of the alloyed component is either (a) not comparably contracted or (b) is in a state of dimensional expansion.

As should be apparent and as discussed previously, when the axis respecting the inlet air duct 133 (the axis again being defined as the continua of the general fluid flow and flux cross-sectional midpoints aligned with the direction of general fluid flow and flux in the duct) is essentially aligned to the axis of rotation for the rotor 111, the nozzle 305 and spray rack water pipe 303 configuration which will enable sufficiently symmetrical and uniform cooling of the housing 125 will preferably be more radially symmetrical (disposed on a circularly-, elliptically-, or ovally-shaped water pipe) with respect to the position of the effective axis of the inlet air duct 133.

Another wet compression instrumentation enhancement is the use of a combustion section liquid presence sensor (as represented by sensor element 126 in FIG. 2A) to ascertain the presence of liquid in the entrance to the combustion section at the compressor outlet. In this regard, it may be of use to either limit the amount of water mass flow added to such a level that liquid is not sensed at the compressor outlet (inlet to the combustion section), or (if the combustion chambers 105 are sufficiently robust or protectively coated to withstand any potentially erosive effects of water from the compressor outlet) it may indeed be desirable to add sufficient water to definitely achieve liquid in the combustion section, to achieve extended power augmentation in a manner similar to that now achieved in the art by water injection to the turbine section for $NO_x$ control. Such a sensor or set of sensors should be located at the interior perimeter (inside wall) of housing 125 at the compressor outlet since any free liquid will probably be centrifugally moved to that position.

To aid in the operation of the gas turbine engine 101 incorporating wet compression according to the present invention and as suggested in FIG. 5, a process control computer 337 is, in some cases, connected to the valves 339 which are used for adjusting the mass flow of nebulized water (a single valve 339 is shown, for simplicity of illustration, for adjusting the mass flow of water to an associated spray rack 303) and to the laser target 407, so that the process control computer can execute process control logic for controlling ("turning on" or "turning off") the mass flow of nebulized water to each individual spray rack water pipe 303 and spray rack water nozzle 305, so that deformation in the housing 125 is minimized. In this regard, some embodiments of the present invention use individual tuning nozzles (not shown) which can be installed in either the spray rack assembly 201 or at some other location in the inlet air duct 133 or compressor inlet 102 to provide additional degrees of freedom in achieving stable and responsive control of the wet compression process. The process control computer also executes logic to control the pressure to the entire spray rack assembly 201 to fine-tune the overall mass flow of water supplied under pressure to spray rack assembly 201 from a source of the water, by a valve 341 for example.

Additionally, the process control computer can be connected to measure the temperature of each temperature sensor, measure the inputs from the spray rack vibration monitor 411, measure the inputs from the combustion section liquid presence sensors, control the steam flow to the spray rack steam holes 315, control the addition of a freezing point depressant to the water feed (by means of a valve 343, as shown in FIG. 5), facilitate other measurements such as optical pyrometry measurements of the turbine section blades 121, and facilitate still other measurements and control outputs which might be taken to comprehensively control the overall system's operation.

In operation, the nebulized water mass flow is supplied in a plurality of nebulized water mass flow increments during startup and shutdown of the water addition system, such that operationally-induced thermal stresses within the gas turbine engine 101 due to the use of the nebulized water are sufficiently minimized to preserve structural integrity in the gas turbine engine 101. In this regard, best results are achieved if the amount of water is incrementally increased over time to enable an essential and reasonable thermal equilibrium of and between the various components of the gas turbine engine 101 to be achieved in a stepwise manner over a period of time up to the maximum amount of water flow which is desirable. When the water flow rate is to be decreased, it should be decreased over time in increments which enable an essential and reasonable thermal equilibrium of and between the various components of the gas turbine engine 101 to be achieved in a stepwise manner over a period of time down to the minimum amount of water flow which is desirable. Thus, for example, the size and spacing of the increments should be such that the housing 125 and rotor shaft 127 are not caused to expand or contract to such different degrees and at such different rates, that a mechanical rub occurs between these elements because of axial misalignment. Those skilled in the art will understand that the ramp-up rates employed for various gas turbines (on a dry basis) will provide a readily adaptable basis for determining how quickly increments of a given size should be added or removed according to the present invention.

Adjustments in nebulized water mass flow increments may also be done on a positional basis. In this regard, for example, a measured distortion in housing 125 might be best counteracted by incrementally modifying the nebulized water mass flow in the upper (top) part of inlet air duct 133 by a different percentage than that used to modify the nebulized water mass flow in the lower (bottom) part of inlet air duct 133.

Positionally as well as with respect to time, positive or negative increments of the water mass should be added or subtracted in such a manner as to properly minimize destructive thermal and mechanical stresses to gas turbine engine 101. During the initial stages of implementation, it is useful to confirm the alignment of the housing 125 periodically (after the thermal equilibrium of and between the various components of the gas turbine engine 101 has reasonably been achieved) prior to adding or subtracting the increments of nebulized water mass flow to the inlet air.

In this regard, a clear difference from prior practice (as described in the several background references) is needed in facilitating wet compression in large machines operating under load; in the prior case, the liquid added for wet compression in smaller gas turbines could be essentially "turned on" in a single increment (1) since a smaller gas turbine (especially as used on aircraft) was not as dimensionally sensitive to cooling effects and (2) the use of wet compression was only for a relatively short period of time. In large land-based gas turbines, the liquid added for wet compression should be essentially "turned on" (or, alternatively, either "turned down" or "turned off") in a stepwise plurality of increments in both a positional and time context (1) since a large gas turbine is dimensionally sensitive to associated cooling effects from the added liquid and (2) the use of wet compression is for a sustained and ongoing period of time.

An example of the benefit of wet compression has been an estimated power augmentation of 26 percent above the dry base load capacity of a Westinghouse W501A (with inlet air at 80 degrees Fahrenheit) with the introduction of 89 gallons per minute of water into the machine. Five step increments were used through the spray rack group assembly 201 to reach the 89 gallon per minute flow rate, with each such increment having been qualified as not causing excessive distortion of the housing 125. Water mass added can beneficially range in the 3 to 7 mass percentage range based on current designs and associated compression ratios, but systems designed for wet compression conceivably could employ different mass flow percentages. Other features which can assist the smooth operation of the wet compression feature include the use of a strainer screen for the spray rack pipes 303 to capture particulates. It should also be noted that more frequent compressor cleaning might be beneficial to counteract possible fouling from precipitated minerals when making substantial use of wet compression power augmentation.

The wet compression power augmentation apparatus, system and method of the present invention have been particularly described for a gas turbine including an axial compressor. However, those skilled in the art will readily appreciate that the wet compression power augmentation apparatus, system and method herein described will also be useful for other types of compressors which are used or which have been known in gas turbine systems. Among these other types of compressors are rotary-positive-displacement compressors and centrifugal compressors.

The present invention has been described in an illustrative manner. In this regard, it is evident that those skilled in the art, once given the benefit of this disclosure, may now make modifications to the specific embodiments described herein without departing from the spirit of the present invention. Such modifications are to be considered within the scope of the present invention which is limited solely by the scope and spirit of the appended claims.

What is claimed is:

1. A wet compression power augmentation apparatus for adding a mass flow of nebulized water to a gas turbine, said gas turbine having a housing and a compressor and said compressor having a compressor inlet, comprising:

means for nebulizing water positioned essentially in said compressor inlet and which means is adapted to modify the mass flow of nebulized water in a plurality of nebulized water mass flow increments such that operationally-induced thermal stresses within said turbine due to the use of said mass flow of nebulized water are sufficiently minimized to preserve structural integrity in said gas turbine; and means for providing a sufficient amount of water to said nebulizing water means so that, in continuous operation, an inlet air stream having entrained liquid water particles may be provided to said compressor inlet and the work of compression lessened thereby through latent heat intercooling in the compressor.

2. The wet compression power augmentation apparatus according to claim 1 wherein said wet compression power augmentation apparatus further comprises a means for detecting deformation in said housing.

3. The wet compression power augmentation apparatus according to claim 1 wherein said gas turbine further comprises a turbine section having a plurality of fluid cooled rotor blades and said wet compression power augmentation apparatus further comprises a means for monitoring the temperature profile of each of said fluid cooled rotor blades.

4. The wet compression power augmentation apparatus according to claim 1 wherein said gas turbine further comprises a temperature measuring means in said compressor inlet.

5. The wet compression power augmentation apparatus according to claim 1 wherein said gas turbine is attached to an inlet duct in fluid communication with said compressor inlet and said wet compression power augmentation apparatus further comprises a viewport in said inlet duct positioned near said compressor inlet so that icing can be monitored.

6. The wet compression power augmentation apparatus according to claim 1 wherein said wet compression power augmentation apparatus further comprises a means for adding steam in said compressor inlet.

7. The wet compression power augmentation apparatus according to claim 2 wherein said means for detecting deformation in said housing comprises a laser emitter and laser target measuring system mounted to the exterior of said housing.

8. The wet compression power augmentation apparatus according to claim 3 wherein said means for monitoring the temperature profile of each of said fluid cooled rotor blades comprises an optical pyrometer for monitoring the emitted energy of each of said cooled rotor blades through a sighting tube.

9. The wet compression power augmentation apparatus according to claim 5 wherein said means to monitor icing comprises a video camera positioned and focused to scan for ice buildup through said viewport.

10. The wet compression power augmentation apparatus according to claim 1 comprising at least one nozzle having a throughput which corresponds to one said nebulized water mass flow increment in the plurality of nebulized water mass flow increments.

11. The wet compression power augmentation apparatus according to claim 10 wherein said means for nebulizing water comprises a restricting orifice associated with said at least one nozzle.

12. The wet compression power augmentation apparatus according to claim 6 wherein, in operation, sufficient steam is added to maintain a temperature in said inlet air stream so that icing in said compressor does not substantially occur.

13. The wet compression power augmentation apparatus according to any one of claims 2 and 7 wherein said means for detecting deformation in said housing further comprises a process control computer connected to said means for modifying the mass flow of nebulized water, for controlling said mass flow of nebulized water so that deformation in said housing is minimized.

14. The wet compression power augmentation apparatus according to any one of claims 1 to 12 wherein, in operation, said means for providing water to said nebulizing water means also provides a material which depresses the freezing point of said water particles.

15. The wet compression power augmentation apparatus according to any one of claims 1 to 12 wherein said compressor is an axial compressor.

16. A wet compression power augmentation apparatus for adding a mass flow of nebulized water to a gas turbine, said gas turbine having a housing and an axial compressor, said axial compressor having a rotor, said rotor having an axis of rotation and an axial compressor inlet, said gas turbine further having an inlet air duct attached to said housing and in fluid communication with said axial compressor inlet for providing an inlet air stream to said axial compressor, said inlet air duct having a lower surface and an inlet air duct constricted portion whose axis is essentially perpendicular to said axis of rotation, comprising:
 means for nebulizing water positioned essentially in said inlet air duct constricted portion and which means is adapted to modify the mass flow of nebulized water in a plurality of nebulized water mass flow increments such that operationally-induced thermal stresses within said gas turbine due to the use of said mass flow of nebulized water are sufficiently minimized to preserve structural intergrity in said gas turbine; and
 means for providing a sufficient amount of water to said nebulizing water means so that, in continuous operation, an inlet air stream having entrained liquid water particles is provided to said compressor inlet and the work of compression lessened thereby through latent heat intercooling in the compressor.

17. The wet compression power augmentation apparatus according to claim 16 comprising at least one nozzle having a throughput which corresponds to one said nebulized water mass flow increment in the plurality of nebulized water mass flow increments.

18. The wet compression power augmentation apparatus according to claim 16 wherein said wet compression power augmentation apparatus further comprises a means for detecting deformation in said housing.

19. The wet compression power augmentation apparatus according to claim 16 wherein said means for nebulizing water is positioned essentially in said inlet air duct constricted portion with a sufficient separation from said axial compressor inlet such that, in operation, any said nozzle which breaks away from said means for nebulizing water will be gravitationally pulled to said lower surface of said inlet air duct before said nozzle is pulled into said axial compressor rotor by forces derived from pressure and flow attributes within said inlet air duct.

20. The wet compression power augmentation apparatus according to claim 16 wherein said gas turbine further comprises a turbine section having a plurality of fluid cooled rotor blades and said wet compression power augmentation apparatus further comprises a means for monitoring the temperature profile of each of said fluid cooled rotor blades.

21. The wet compression power augmentation apparatus according to claim 16 wherein said gas turbine further comprises a temperature measuring means in said axial compressor inlet.

22. The wet compression power augmentation apparatus according to claim 16 wherein said gas turbine is attached to an inlet duct in fluid communication with said compressor inlet and said wet compression power augmentation apparatus further comprises a viewport in said inlet duct positioned near said compressor inlet so that icing can be monitored.

23. The wet compression power augmentation apparatus according to claim 16 wherein said wet compression power augmentation apparatus further comprises a means for adding steam in said inlet air duct constricted portion.

24. The wet compression power augmentation apparatus according to claim 18 wherein said means for detecting deformation in said housing comprises a laser emitter and laser target measuring system mounted to the exterior of said housing.

25. The wet compression power augmentation apparatus according to claim 20 wherein said means for monitoring the temperature profile of each of said fluid cooled rotor blades comprises an optical pyrometer for monitoring the emitted energy of each of said cooled rotor blades through a sighting tube.

26. The wet compression power augmentation apparatus according to claim 22 wherein said means to monitor icing comprises a video camera positioned and focused to scan for ice buildup through said viewport.

27. The wet compression power augmentation apparatus according to claim 17 wherein said means for nebulizing water comprises a restricting orifice associated with said at least one nozzle.

28. The wet compression power augmentation apparatus according to any one of claims 18 and 24 wherein said means for detecting deformation in said housing further comprises a process control computer connected to said means for modifying the mass flow of nebulized water so that said process control computer can execute process control logic to control said mass flow of nebulized water so that deformation in said housing is minimized.

29. The wet compression power augmentation apparatus according to any one of claims 16 to 27 wherein, in operation, said means for providing water to said nebulizing water means also provides a material which depresses the freezing point of said water particles.

30. A wet compression power augmentation method for adding nebulized water to a gas turbine, said gas turbine having a housing and a compressor, said compressor having a compressor inlet, comprising:
 nebulizing water in said compressor inlet; and
 adding water to modify said nebulized water in a plurality of nebulized water mass flow increments such that operationally-induced thermal stresses within said gas turbine due to the ingestion and evaporation in whole or in part of said
 nebulized water are sufficiently minimized to preserve structural integrity in said gas turbine.

31. The wet compression power augmentation method according to claim 30 wherein said wet compression power augmentation method further comprises detecting deformation in said housing.

32. The wet compression power augmentation method according to claim 30 wherein said gas turbine further comprises a turbine section having a plurality of fluid cooled rotor blades and said wet compression power augmentation method further comprises monitoring the temperature profile of each of said fluid cooled rotor blades.

33. The wet compression power augmentation method according to claim 30 further comprising measuring the temperature in said compressor inlet.

34. The wet compression power augmentation method according to claim 30 further comprising monitoring for icing in said compressor inlet.

35. The wet compression power augmentation method according to claim 30 further comprising adding steam in said compressor inlet.

36. The wet compression power augmentation method according to claim 35 wherein sufficient steam is added to maintain a temperature in said inlet air stream so that icing in said compressor inlet does not substantially occur.

37. The wet compression power augmentation method according to any one of claims 30 to 36 further comprising adding a material which depresses the freezing point of said nebulized water.

38. The wet compression power augmentation method of claim 31 further comprising adjusting the plurality of water mass flow increments to minimize said deformation in said housing.

39. A wet compression power augmentation apparatus for adding a mass flow of nebulized water to a gas turbine, said gas turbine having a housing and a compressor and said compressor having a compressor inlet, comprising:
    means for nebulizing water positioned essentially in said compressor inlet;
    means for detecting deformation in said housing; and
    means for providing a sufficient amount of water to said nebulizing water means so that, in continuous operation, an inlet air stream having entrained liquid water particles may be provided to said compressor inlet and the work of compression lessened thereby through latent heat intercooling in the compressor.

40. The wet compression power augmentation apparatus according to claim 39 wherein said means for nebulizing water is adapted to modify the mass flow of nebulized water in a plurality of nebulized water mass flow increments such that operationally-induced thermal stresses within said gas turbine due to the use of said mass flow of nebulized water are sufficiently minimized to preserve structural integrity in said gas turbine.

41. The wet compression power augmentation apparatus according to claim 39 wherein said gas turbine further comprises a turbine section having a plurality of fluid cooled rotor blades and said wet compression power augmentation apparatus further comprises a means for monitoring the temperature profile of each of said fluid cooled rotor blades.

42. The wet compression power augmentation apparatus according to claim 39 wherein said gas turbine further comprises a temperature measuring means in said compressor inlet.

43. The wet compression power augmentation apparatus according to claim 39 wherein said gas turbine is attached to an inlet duct in fluid communication with said compressor inlet and said wet compression power augmentation apparatus further comprises a viewport in said inlet duct positioned near said compressor inlet so that icing can be monitored.

44. The wet compression power augmentation apparatus according to claim 39 wherein said wet compression power augmentation apparatus further comprises a means for adding steam in said compressor inlet.

45. The wet compression power augmentation apparatus according to claim 39 wherein said means for detecting deformation in said housing comprises a laser emitter and laser target measuring system mounted to the exterior of said housing.

46. The wet compression power augmentation apparatus according to claim 41 wherein said means for monitoring the temperature profile of each of said fluid cooled rotor blades comprises an optical pyrometer for monitoring the emitted energy of each of said cooled rotor blades through a sighting tube.

47. The wet compression power augmentation apparatus according to claim 43 wherein said means to monitor icing comprises a video camera positioned and focused to scan for ice buildup through said viewport.

48. The wet compression power augmentation apparatus according to claim 40 comprising at least one nozzle having a throughput which corresponds to one said nebulized water mass flow increment in the plurality of nebulized water mass flow increments.

49. The wet compression power augmentation apparatus according to claim 48 wherein said means for nebulizing water comprises a restricting orifice associated with said at least one nozzle.

50. The wet compression power augmentation apparatus according to claim 44 wherein, in operation, sufficient steam is added to maintain a temperature in said inlet air stream so that icing in said compressor inlet does not substantially occur.

51. The wet compression power augmentation apparatus according to any one of claims 39 and 45 wherein said means for detecting deformation in said housing further comprises a process control computer connected to said means for providing water, for controlling said mass flow of nebulized water so that deformation in said housing is minimized.

52. The wet compression power augmentation apparatus according to any one of claims 39 to 50 wherein, in operation, said means for providing water to said nebulizing water means also provides a material which depresses the freezing point of said water particles.

53. The wet compression power augmentation apparatus according to any one of claims 39 to 50 wherein said compressor is an axial compressor.

54. A wet compression power augmentation apparatus for adding a mass flow of nebulized water to a gas turbine constructed of alloyed metal components containing alloying elements, said gas turbine having a housing and a compressor and said compressor having a compressor inlet, comprising:
    means for nebulizing water positioned essentially in said compressor inlet; and
    means for providing water to said nebulizing water means wherein said means for providing water provides water having a compositional balance of chemical elements respective to said alloyed metal components so that, in continuous operation, an inlet air stream having entrained water particles is provided to said compressor inlet, said compositional balance sufficiently minimizing leaching of alloying elements from said alloyed metal components so that the integrity of said alloyed metal components is properly preserved.

55. A wet compression power augmentation apparatus for adding a mass flow of nebulized water to a gas turbine, said gas turbine having a housing and a compressor and said compressor having a compressor inlet, comprising:

an inlet air duct attached to said compressor in fluid communication with said compressor inlet, said inlet air duct having a lower surface;

means for nebulizing water positioned in said inlet air duct with sufficient separation from said axial compressor inlet such that, in operation, any portion of said means for nebulizing water which breaks away from said means for nebulizing water will be gravitationally pulled to said lower surface before said portion is conveyed into said compressor by forces derived from pressure and flow attributes within said inlet air duct; and means for providing a sufficient amount of water to said nebulizing water means so that, in continuous operation, an inlet air stream having entrained liquid water particles may be provided to said compressor inlet and the work of compression lessened thereby through latent heat intercooling in the compressor.

56. The wet compression power augmentation apparatus according to claim 55 wherein said wet compression power augmentation apparatus further comprises a means for detecting deformation in said housing.

57. The wet compression power augmentation apparatus according to claim 55 wherein said gas turbine further comprises a turbine section having a plurality of fluid cooled rotor blades and said wet compression power augmentation apparatus further comprises a means for monitoring the temperature profile of each of said fluid cooled rotor blades.

58. The wet compression power augmentation apparatus according to claim 55 wherein said gas turbine further comprises a temperature measuring means in said compressor inlet.

59. The wet compression power augmentation apparatus according to claim 55 further comprising a viewport in said inlet duct positioned near said compressor inlet so that icing can be monitored.

60. The wet compression power augmentation apparatus according to claim 55 wherein said wet compression power augmentation apparatus further comprises a means for adding steam in said compressor inlet.

61. The wet compression power augmentation apparatus according to claim 56 wherein said means for detecting deformation in said housing comprises a laser emitter and laser target measuring system mounted to the exterior of said housing.

62. The wet compression power augmentation apparatus according to claim 57 wherein said means for monitoring the temperature profile of each of said fluid cooled rotor blades comprises an optical pyrometer for monitoring the emitted energy of each of said cooled rotor blades through a sighting tube.

63. The wet compression power augmentation apparatus according to claim 59 wherein said means to monitor icing comprises a video camera positioned and focused to scan for ice buildup through said viewport.

64. The wet compression power augmentation apparatus according to claim 55 comprising at least one nozzle for providing a nebulized water mass flow increment.

65. The wet compression power augmentation apparatus according to claim 64 comprising a plurality of said nozzles for providing a corresponding plurality of nebulized water mass flow increment.

66. The wet compression power augmentation apparatus according to claim 65 wherein said means for nebulizing water comprises a restricting orifice associated with said at least one nozzle.

67. The wet compression power augmentation apparatus according to claim 60 wherein, in operation, sufficient steam is added to maintain a temperature in said inlet air stream so that icing in said compressor does not substantially occur.

68. The wet compression power augmentation apparatus according to any one of claims 56 and 61, further comprising a means for modifying the mass flow of nebulized water provided to the compressor inlet and wherein said means for detecting deformation in said housing further comprises a process control computer connected to said means for modifying the mass flow of nebulized water, for controlling said mass flow of nebulized water so that deformation in said housing is minimized.

69. The wet compression power augmentation apparatus according to any one of claims 55 to 67 wherein, in operation, said means for providing water to said nebulizing water means also provides a material which depresses the freezing point of said water particles.

70. The wet compression power augmentation apparatus according to any one of claims 55 to 67 wherein said compressor is an axial compressor.

71. The wet compression power augmentation method according to any one of claims 30 to 36 wherein said compressor has a compressor outlet and said wet compression power augmentation method further comprises measuring the presence of liquid in said compressor outlet.

72. A wet compression power augmentation apparatus for adding a mass flow of nebulized water to a gas turbine, said gas turbine having a housing, a turbine section having a plurality of fluid cooled rotor blades, and a compressor, and said compressor having a compressor inlet, comprising:

means for monitoring the temperature profile of each of said fluid cooled rotor blades;

means for nebulizing water positioned essentially in said compressor inlet;

means for providing a sufficient amount of water to said nebulizing water means so that, in continuous operation, an inlet air stream having entrained liquid water particles may be provided to said compressor inlet and the work of compression lessened thereby through latent heat intercooling in the compressor; and means for detecting deformation in said housing associated with the ingestion of said entrained liquid water particles into the compressor.

73. The wet compression power augmentation apparatus according to claim 72, wherein said means for detecting deformation in said housing comprises a laser emitter and laser target measuring system mounted to the exterior of said housing.

74. A wet compression power augmentation apparatus for adding a mass flow of nebulized water to a gas turbine, said gas turbine having a housing, a turbine section having a plurality of fluid cooled rotor blades and a compressor having a compressor inlet, with the gas turbine being attached to an inlet duct which is in fluid communication with the compressor inlet, said power augmentation apparatus comprising:

means for monitoring the temperature profile of each of said fluid cooled rotor blades;

means for nebulizing water positioned essentially in said compressor inlet;

means for providing a sufficient amount of water to said nebulizing water means so that, in continuous operation, an inlet air stream having entrained liquid water particles may be provided to said compressor inlet and the work of compression lessened thereby through latent heat intercooling in the compressor; and a viewport in said inlet duct positioned near said compressor inlet so that icing from the addition of the nebulized water can be monitored.

75. The wet compression power augmentation apparatus according to claim 74, further comprising a video camera positioned and focused to scan for ice buildup through said viewport.

76. A wet compression power augmentation apparatus for adding a mass flow of nebulized water to a gas turbine, said gas turbine having a housing, a turbine section having a plurality of fluid cooled rotor blades, and a compressor, and said compressor having a compressor inlet, comprising:

means for monitoring the temperature profile of each of said fluid cooled rotor blades;

means for nebulizing water positioned essentially in said compressor inlet;

means for providing a sufficient amount of water to said nebulizing water means so that, in continuous operation, an inlet air stream having entrained liquid water particles may be provided to said compressor inlet and the work of compression lessened thereby through latent heat intercooling in the compressor; and means for adding steam in said compressor inlet.

77. The wet compression power augmentation apparatus according to claim 76 wherein, in operation, sufficient steam is added through said steam addition means to maintain a temperature in said inlet air stream, so that icing in said compressor inlet does not substantially occur.

78. A wet compression power augmentation apparatus for adding a mass flow of nebulized water to a gas turbine, said gas turbine having a housing, a turbine section having a plurality of fluid cooled rotor blades, and a compressor, and said compressor having a compressor inlet, comprising:

means for monitoring the temperature profile of each of said fluid cooled rotor blades;

means for nebulizing water positioned essentially in said compressor inlet, with said means being suited for delivering a mass flow of nebulized water to the compressor inlet in a plurality of nebulized water mass flow increments so that operationally-induced thermal stresses within said gas turbine due to the use of said mass flow of nebulized water are sufficiently minimized to preserve the structural integrity of the gas turbine, and wherein at least one increment of the plurality of nebulized water mass flow increments is provided by means of a nozzle whose throughput corresponds to the increment; and means for providing a sufficient amount of water to said nebulizing water means so that, in continuous operation, an inlet air stream having entrained liquid water particles may be provided to said compressor inlet and the work of compression lessened thereby through latent heat intercooling in the compressor.

79. The wet compression power augmentation apparatus according to claim 78, wherein a restricting orifice is associated with the nozzle.

80. The wet compression power augmentation apparatus according to any one of claims 1 to 12, 39 to 50 and 72 to 78 wherein said compressor has a compressor outlet and said wet compression power augmentation apparatus further comprises a means for measuring the presence of liquid, said means for measuring the presence of liquid being positioned in said compressor outlet.

81. The wet compression power augmentation apparatus according to any one of claims 73 and 74 wherein said means for detecting deformation in said housing further comprises a process control computer connected to said means for adjusting the mass flow of nebulized water, for controlling said mass flow of nebulized water so that deformation in said housing is minimized.

82. The wet compression power augmentation apparatus according to any one of claims 73 to 80 wherein, in operation, said means for providing water to said nebulizing water means also provides a material which depresses the freezing point of said water particles.

83. The wet compression power augmentation apparatus according to any one of claims 73 to 80 wherein said compressor is an axial compressor.

84. A wet compression power augmentation apparatus for adding a mass flow of nebulized water to a gas turbine, said gas turbine having a housing and a compressor and said compressor having a compressor inlet, comprising:

means for providing nebulized water to said compressor inlet in the form of a plurality of nebulized water mass flow increments;

means for providing a sufficient amount of water to said nebulizing water means so that an inlet air stream having entrained liquid water particles may be provided to the compressor inlet in the operation of the turbine and the work of compression lessened thereby through latent heat intercooling in the compressor; and means for detecting deformation in the turbine's housing.

85. The wet compression power augmentation apparatus according to claim 84, wherein said means for detecting deformation in said housing further comprises a process control computer connected to said means for modifying the mass flow of nebulized water, for controlling said mass flow of nebulized water so that deformation in said housing is minimized.

86. A wet compression power augmentation apparatus for adding a mass flow of nebulized water to a gas turbine, said gas turbine having a housing and a compressor and said compressor having a compressor inlet, comprising:

means for providing nebulized water to said compressor inlet in the form of a plurality of nebulized water mass flow increments;

means for providing a sufficient amount of water to said nebulizing water means so that an inlet air stream having entrained liquid water particles may be provided to the compressor inlet in the operation of the turbine and the work of compression lessened thereby through latent heat intercooling in the compressor; and means for adding steam in the compressor inlet.

87. A wet compression power augmentation method for achieving an increase in power production from a gas turbine, said gas turbine having a housing and a compressor with a compressor inlet, comprising:

providing an amount of nebulized water to said compressor inlet so that at least a portion of this water is ingested by and evaporated in the compressor, and thereby provides a degree of latent heat intercooling to said compressor;

incrementally modifying the mass flow of nebulized water provided to said compressor inlet; and detecting deformation in said housing as the mass flow is so modified.

88. A wet compression power augmentation method for achieving an increase in power production from a gas turbine, said gas turbine having a housing and a compressor with a compressor inlet, comprising:

providing an amount of nebulized water to said compressor inlet so that at least a portion of this water is ingested by and evaporated in the compressor, and thereby provides a degree of latent heat intercooling to said compressor;

incrementally modifying the mass flow of nebulized water provided to said compressor inlet; and adding steam in said compressor inlet to keep ice from forming in the compressor inlet.

* * * * *

UNITED STATES PATENT AND TRADEMARK OFFICE
CERTIFICATE OF CORRECTION

PATENT NO. : 5,930,990  
DATED : August 3, 1999  
INVENTOR(S) : Richard E. Zachary, et. al.

Page 1 of 3

It is certified that error appears in the above-identified patent and that said Letters Patent is hereby corrected as shown below:

Drawings:

Drawing Sheets 1 of 7 – Sheet 7 of 7 should read – sheet 1 of 9--

Signed and Sealed this

Twenty-fourth Day of October, 2000

Attest:

Q. TODD DICKINSON

*Attesting Officer*        *Director of Patents and Trademarks*

Disclaimer 5,930,990—Richard E. Zachary, Clinton; Roger D. Hudson, Zachary, both of La. Method And Apparatus For Achieving Power Augmentation In Gas Turbines Via Wet Compression. August 3, 1999. Disclaimer filed February 12, 2001, by the assignee, The Dow Chemical Company.

The term of this patent subsequent to May 14, 2016 has been disclaimed.
*(Official Gazette, October 2, 2001)*